(12) United States Patent
Shimomura et al.

(10) Patent No.: US 6,404,525 B1
(45) Date of Patent: Jun. 11, 2002

(54) OPTICAL ADD-DROP MULTIPLEXER

(75) Inventors: Hirofumi Shimomura; Naoya Henmi; Hitoshi Takeshita, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/123,529

(22) Filed: Jul. 28, 1998

(30) Foreign Application Priority Data

| Jul. 31, 1997 | (JP) | 9-205706 |
| Aug. 5, 1997 | (JP) | 9-210562 |
| Sep. 22, 1997 | (JP) | 9-273268 |

(51) Int. Cl.$^7$ .............................................. H04J 14/02
(52) U.S. Cl. ........................ 359/127; 359/128; 359/110
(58) Field of Search ........................ 359/110.127, 128, 359/129, 130, 161

(56) References Cited

U.S. PATENT DOCUMENTS

| 5,550,818 A | * | 8/1996 | Brackett et al. ............. 359/124 |
| 5,612,805 A | * | 3/1997 | Fevrier et al. .............. 359/124 |
| 5,771,112 A | * | 6/1998 | Hamel et al. ............... 359/128 |
| 5,867,289 A | * | 2/1999 | Gerstel et al. .............. 359/110 |
| 5,940,197 A | * | 8/1999 | Ryu ........................... 359/152 |
| 6,148,124 A | * | 11/2000 | Aksuk et al. ................ 359/127 |
| 6,243,179 B1 | * | 6/2001 | Thompson et al. ......... 359/130 |

FOREIGN PATENT DOCUMENTS

JP 3-7917 1/1991

(List continued on next page.)

OTHER PUBLICATIONS

Japanese Office Action of Aug. 16, 2000, with partial English Translation.
Japanese Office Action of Feb. 16, 2000, in JPA 9–273268 and the partial translation.
F. Shehadeh, T. Suzaki, et al., Impact of external modulator chirp for 10–Gbit/s transmission in an eight–wavelength eight–node WDM ring network', 1997, OFC'97 TuE4, 1997.04.23 pp. 21–22.
Japanese Office Action dated Aug. 3, 1999, with partial translation.
Japanese Office Action dated Sep. 7, 1999, with partial translation.

*Primary Examiner*—Leslie Pascal
(74) *Attorney, Agent, or Firm*—McGinn and Gibb, PLLC

(57) ABSTRACT

An optical wavelength division coupler 11 wavelength-divides a wavelength multiplexed light to respective wavelength lights each of which is dropped to an optical gate switch 15-i (i=1~n) and a light receiver 13-i by an optical coupler 12-i and supplied to an optical light fault monitor 14 through the light receiver 13-i. When the optical signal deterioration monitor 14 detects an optical loss of wavelength (OLOW), an optical loss of signal (OLOS) or an optical signal degrade (OSD) in wavelength lights processed by the optical coupler 12-i as a fault detection signal in an optical layer, a controller 19 controls the optical gate switch 15-i to cut off wavelength light passing therethrough and sends an optical alarm indication signal (AIS-O) to a downstream side. Therefore, when a loss of signal is detected by the light receiver 13-i, the optical signal deterioration monitor 14 can know the alarm indication signal (AIS) from the upstream side, removing the necessity of special hardware therefor.

10 Claims, 32 Drawing Sheets

FOREIGN PATENT DOCUMENTS

| | | |
|---|---|---|
| JP | 3-269522 | 12/1991 |
| JP | 4-25825 | 1/1992 |
| JP | 4-62528 | 2/1992 |
| JP | 4-306624 | 10/1992 |
| JP | 4-361583 | 12/1992 |
| JP | 5-29686 | 2/1993 |
| JP | 5-127037 | 5/1993 |
| JP | 5-130044 | 5/1993 |
| JP | 5-308166 | 11/1993 |
| JP | 6-53581 | 2/1994 |
| JP | 6-284092 | 10/1994 |
| JP | 6-311139 | 11/1994 |
| JP | 6-324368 | 11/1994 |
| JP | 7-226560 | 8/1995 |
| JP | 7-245436 | 9/1995 |
| JP | 7-326826 | 12/1995 |
| JP | 8-51411 | 2/1996 |
| JP | 8-111550 | 4/1996 |
| JP | 8-293853 | 11/1996 |
| JP | 9-36834 | 2/1997 |
| JP | 9-179152 | 7/1997 |
| JP | 9-200157 | 7/1997 |
| JP | 9-261181 | 10/1997 |
| JP | 11-46029 | 2/1999 |
| JP | 11-46030 | 2/1999 |

* cited by examiner

OPTICAL ADD-DROP MULTIPLEXER

BACKGROUND OF THE INVENTION

The present invention claims priorities from Japanese Patent Applications No.9-205706 filed Jul. 31, 1997, No.9-210562 filed Aug. 5, 1997 and No.9-273268 filed Sep. 22, 1997, which are incorporated herein by reference.

1. Field of the Invention

The present invention relates to an Optical Add-Drop Multiplexer (OADM) capable to of switching a transmission line of a wavelength-multiplexed optical signal without electrically terminating the optical signal and an optical signal monitor utilizing the OADM.

2. Description of the Related Art

As the optical network, a network constructed on the basis of SONET (Synchronous Optical Network)/SDH (Synchronous Digital Hierarchy) using the time division multiplexing (TDM) has been used popularly. In a network based on this SONET/SDH, the switching of transmission line is usually performed by terminating an optical signal by a line layer, switching the transmission line and then multiplexing the optical signal again.

In this transmission line switching, in order to maintain the reliability of link connection, reliability evaluation values such as loss of frame (LOF), loss of pointer (LOP), bit error rate (BER), etc., are detected by detecting loss of signal (LOS) as described in, for example, GR-253-CORE (Issue Dec. 1, 1994) describing Bellcore (Bell Communications Research) standard or evaluating section overhead (SOH) in a frame or line overhead (LOH).

Recently, an OADM which is capable of performing the transmission line switching without electrically terminating an optical signal has been proposed and its introduction into a practical system has been studied. Contrary to the transmission line switching in the digital cross-connect system (DCS) which is one of network elements of the SONET is performed through opto-electric (O/E) conversion, a demultiplexer (DEMUX), a switching, a multiplexer (MUX) and an electro-optical (E/O) conversion, the transmission line switching in the OADM can be done by only the switching and the DEMUX and the MUX for the electric signal are unnecessary. Therefore, it is possible in the OADM to reduce amount of hardware per transmission optical signal rate and to reduce the cost and the system size.

In a case where some failure occurs in a network having an OADM, the OADM is required to detect and judge faults such as loss of signal light due to breakage of optical fiber and degradation of signal light quality due to failure of such as optical repeater/amplifier and to perform a recovering operation corresponding to the kind of fault. In a case where a network fault is detected by utilizing a standard frame overhead in the currently used SONET/SDH, there is a necessity occurs in the OADM of terminating a section or line.

When a fault occurs in the line including the OADM, in order to notify an end user of the line the occurrence of the fault, read/write processing of an alarm indication signal (AIS) from the frame overhead becomes necessary in the OADM. In an OADM dealing with a high density multiplexed optical signal, however, there are problems that it is necessary to not only provide a large scale hardware in order to obtain the AIS from the frame overhead of the transmitted optical signal, but also electrically terminate the multiplexed optical signal, read the frame overhead and multiplex the optical signals again in order to merely read a fault monitor information within the network.

Further, in order to introduce the OADM into the currently existing optical network, it is necessary to deal with the optical signal separately from the time-multiplex orientated SONET/SDH layer, electrically process it synchronously in time and define a wavelength/space multiplexing orientated layer which does not obtain an information from that optical signal or does not add information thereto as an optical layer to thereby make an automatic protection system (APS) which is network fault recovery means supplied by the SONET/SDH non conflict with a protection system in the optical layer newly supplied by the OADM.

This is because, even if the SONET/SDH be disappeared in an ideal construction of future optical network, the resources of the SONET/SDH must be used for at least the present since the SONET/SDH is currently in world wide use and, since it is difficult in view of cost to immediately change from the APS to the protection system by the OADM, it is necessary to exist APS together the protection in the optical layer using the OADM for at least the present.

Considering the introduction of the OADM into a practical network, the ability of the OADM can not be fully used regardless of the high potential thereof which makes the reduction amount of hardware per transmitted optical signal possible, due to the above mentioned problems. In order to use the ability of the OADM sufficiently, it is indispensable to develop a system for monitoring a network fault and recovering the fault suitably for a network dealing with high density multiplexed signal and a hardware therefor while maintaining the compatibility with respect to the SONET/SDH.

SUMMARY OF THE INVENTION

An object of the present invention is to provide an OADM capable of dropping/adding a signal light having arbitrary wavelength within a node and to reduce cost and size of the OADM node by defining a fault detection signal of an optical signal cut-off in a wavelength/space multiplexing oriented optical layer which does not conflict with a transmitter of SONET/SDH or other framing format.

According to a first aspect of the present invention, the OADM node comprises an optical wavelength division coupler for wavelength-dividing a wavelength-multiplexed light In input from one optical transmission line to optical signals having respective wavelengths, a plurality of light receivers each for receiving different one of the respective wavelength optical signals from the optical wavelength division coupler, a plurality of optical gate switches each for on-off controlling different one of the respective wavelength signals, a plurality of light transmitters provided correspondingly to the plurality of the light receivers for-transmitting the respective wavelength optical signals, respectively, and an optical wavelength multiplex coupler connected to outputs of the optical gate switches and outputs of the light transmitters for wavelength-multiplexing the respective wavelength optical signals and sending the wavelength-multiplexed optical signal to another optical transmission line.

The optical gate switch should have a low cross-talk and low insertion loss characteristics. For example, a semiconductor optical switch using a semiconductor optical amplifier may be suitable for the optical gate switch.

However, when gain of such semiconductor optical amplifier is small, S/N ratio is degraded due to spontaneously emitted light noise when a signal light is input to the optical amplifier. Therefore, it is necessary to increase the gain. However, since, when an output of the semiconductor optical amplifier is increased, inverted population density of carrier is reduced, gain is saturated, resulting in an output saturation. Under the condition of such output saturation, the signal waveform is distorted, causing receiving sensitivity to be degraded. Further, since, when such semiconductor optical switch is moduled, optical coupling loss of a semiconductor chip and optical fiber is several dB, the saturated output power becomes small. Since a practical difference between output power limit and S/N degradation is as narrow as several dB, the freedom of design of optical level in constructing a system is substantially restricted. Under such conditions, a severe optical level regulation is necessary, so that the number of monitor items for light intensity is increased, which restricts the reduction of scale of a node. For these reasons, a realization of an optical switch having low cross-talk and large saturation output power is expected.

According to the present invention, an impurity doped optical fiber is used and a signal light input to the input side optical transmission line is on-off controlled by controlling an intensity of a pumping light and an intensity of the signal light output to the output side optical transmission line is controlled by controlling the intensity of the pumping light during an on state of the input signal light. Further, a combination of such impurity doped optical fiber amplifier and a semiconductor optical amplifier may be utilized as the optical switch.

In the latter case, the following various constructions may be realized:

(a) an optical filter which allows only an input signal light to pass through is inserted into an output side optical transmission line;

(b) a reflection mirror which reflects an output signal light back to the impurity doped fiber is arranged on an output end of the output side optical transmission line and an optical coupler for dropping (branching) the signal light output from the impurity doped fiber is inserted into the input side optical transmission line;

(c) the output end of the output side optical transmission line is connected to the optical coupler inserted into the input side optical transmission line so that the signal light output from the output side optical transmission line is transmitted through the input side optical transmission line in a direction opposite to the input signal light;

(d) an optical coupler for connecting the pumping light output from the pumping light in source to the impurity doped fiber is provided on the input side of the impurity doped fiber;

(e) an optical coupler for connecting the pumping light output from the pumping light source to the impurity doped fiber is provided on the output side of the impurity doped fiber;

(f) optical isolators are inserted into arbitrary positions of the input side and output side optical transmission lines, respectively;

(g) a plurality of pumping light sources are provided and pumping lights from the respective pumping light sources are wavelength-multiplexed and input to the impurity doped fiber.

In such optical switch, it is possible to realize an optical switch having the low cross-talk which can be freely set by on-off controlling the pumping power in the pumping light source and the insertion loss of the switch which is freely set by controlling the pumping power. That is, it is possible to obtain an optical switch which has low cross-talk and high output power characteristics and an input/output construction thereof can be is freely set according to a system demand.

According to a second aspect of the present invention, an OADM comprises an optical circulator for receiving a wavelength-multiplexed light from one optical transmission line and supplying a wavelength multiplexed light to the other optical transmission line, an optical wavelength division multiplex coupler connected to the circulator for, on one hand, wavelength-dividing the wavelength-multiplexed light input from the input of the circulator to a plurality of wavelength lights having different wavelengths and for, on the other hand, wavelength multiplexing the plurality of wavelength lights having different wavelengths and supplying it to the optical circulator, first optical couplers connected to the optical wavelength division multiplex coupler, for receiving/sending a plurality of wavelength lights having different wavelengths with respect to the optical wavelength division multiplex coupler, respectively, light receivers connected to the respective first optical couplers for receiving optical outputs of the first optical couplers, light transmitters provided correspondingly to the light receivers for supplying the plurality of wavelength lights having different wavelengths constructing the wavelength multiplexed light optical gate switches provided correspondingly to the wavelength-divided lights, each optical gate switch for on-off controlling a light passing therethrough, second optical couplers provided correspondingly to the respective wavelength-divided lights and connected to the respective light transmitters for receiving lights from the light transmitters, respectively, the second optical couplers being connected, on one sides thereof, to the optical inputs/outputs of the first optical couplers, respectively, and, on the other sides thereof, to one sides of the optical gate switches to input/output wavelength lights with respect thereto, respectively, and light reflection mirrors provided correspondingly to the respective wavelength-divided lights and connected to the other sides of the optical gate switches, respectively. The wavelength-multiplexed light output from the light input/output of the optical circulator and received by the optical wavelength division multiplex coupler is output from the optical wavelength division multiplex coupler to the optical transmission line through the light output of the optical circulator.

According to a third aspect of the present invention, an OADM comprises an optical wavelength division multiplex coupler for wavelength-dividing a wavelength-multiplexed light input from an optical transmission line on one hand and wavelength-multiplexing the wavelength-divided lights and supplying a wavelength-multiplexed light to the optical transmission line on the other hand, first optical couplers connected to the optical wavelength division multiplex coupler, the first optical couplers being adapted to input/output the wavelength lights having different wavelengths with respect to the optical wavelength division multiplex coupler on one hand and to drop portions of the wavelength lights having different wavelengths, respectively, on the other hand, light receivers connected to the respective first optical couplers for receiving the dropped optical outputs of the first optical couplers, respectively, light transmitters provided correspondingly to the respective light receivers for supplying the plurality of wavelength lights having different wavelengths constructing the wavelength-multiplexed light, respectively, optical gate switches provided correspondingly to the respective wavelength-divided lights, each optical gate switch being adapted to on-off control a light passing therethrough, optical isolators provided correspondingly to the respective wavelength-divided lights and adapted to pass only corresponding light outputs of the optical gate switches, respectively, second optical couplers provided correspondingly to the respective wavelength-divided lights, the second optical couplers being connected to the light inputs/outputs of the first optical couplers, the second optical couplers being adapted to drop portions of the respective wavelength-divided lights and to receive lights from the respective light transmitters and third optical couplers provided correspondingly to the respective wavelength-divided lights, the third optical couplers being connected to the light inputs/outputs of the second optical couplers, the second optical couplers being adapted to receive the light outputs of the respective optical isolators and output wavelength lights having different wavelengths from the wavelengths of the output lights of the optical isolators to the optical gate switches. One of the respective wavelength-divided lights is passed through a path including one of the first optical couplers, one of the second optical couplers, one of the third optical couplers, one of the optical gate switches and one of the optical isolators, corresponding to one wavelength light, and returned to the optical wavelength division multiplex coupler through a path including another of the third optical couplers and another of the second optical coupler, corresponding to another wavelength light having wavelength adjacent to that of the one wavelength light and the optical wavelength division multiplex coupler wavelength-multiplexes the returned lights.

According to another aspect of the present invention, an OADM comprises control means for selecting one of pass, drop and add of an optical signal by selectively switching on/off states of the optical gates, presence/absence of optical signal input to the light receivers and presence/absence of optical signals output from the light transmitters and optical signal fault monitor means having functions of monitoring an optical signal cut-off fault by either detecting the optical loss of signal (OLOS) by determining presence or absence of a signal light on a basis of calculation of an optical S/N ratio from a ratio of intensity of light having wavelength within a wavelength range of a certain width including at least the signal light to intensity of spontaneously emitted light having wavelength within a different wavelength range of substantially the same width as the predetermined width or determining presence or absence of the signal light from intensity of light within a wavelength range of a certain width including the signal light, or detecting the optical loss of wavelength (OLOW) by monitoring wavelength deviation of the signal light from intensity of light within the wavelength range and a function of calculating an optical S/N ratio from a ratio of intensity of light within a wavelength range of a predetermined width including at least the signal light to intensity of spontaneously emitted light having wavelength within a different wavelength range of substantially the same width as the predetermined width and detecting the optical signal degrade (OSD) when the optical S/N ratio becomes smaller than a predetermined threshold value, for detecting at least one of the OLOS, the OLOW and the OSD as fault detection signals, wherein, when the optical signal fault monitor means detects at least one of the fault detection signals, the control means controls the gates to cut off signal lights from an output corresponding to the detected input to convert the detected fault detection signal into an optical alarm indication signal (AIS-O).

It is possible to monitor an optical signal fault by utilizing the above mentioned OADM. That is, an optical network provided with these OADM's, optical repeaters/amplifiers and line terminators for terminating optical signal and processing an optical signal obtained by wavelength-multiplexing light signals each on an optical fiber comprises the above mentioned optical signal fault monitor means as an optical layer monitor, An optical signal fault monitor system according to another aspect of the present invention has a function of converting a fault signal into the optical alarm indication signal (AIS-O) in an optical layer by cutting off the signal light from an output correspondingly to the fault detection signal detected by the control means when the OADM detects at least one of the fault detection signals. With this AIS-O conversion function, the signal processing is simplified since an electric signal obtained by electrically terminating an optical signal wavelength multiplexed with at least one wavelength in time synchronism contains no signal information and there is no case where any new information is added.

In optical signal fault monitor system according to another aspect of the present invention, an optical network for processing an optical signal wavelength-multiplexed with at least one wavelength in each optical fiber comprises OADM's and optical repeaters/amplifiers provided with at least the above mentioned optical layer monitor, respectively, and a transmission device connected to the OADM's, the optical repeaters/amplifiers and the optical layer, the optical layer monitor monitors an optical signal cut-off fault in the network by at least one of OLOS and AIS-O in the optical layer.

In an optical signal fault monitor system according to a further aspect of the present invention, in which the optical signal fault of the optical network is monitored by utilizing one of the OADM and the optical repeater/amplifier, a network fault is noticed to a transmission device connecting the optical layer to other layer than the optical layer by converting the OLOS of the network fault in the optical layer into the AIS-O.

For recovery of fault, when a fault of the optical network is monitored by using the OLOS and the AIS-O in the optical layer instead of a signal for informing an occurrence of fault of a transmission device connected to the optical layer by utilizing one of the OADM and the optical repeater/amplifier and when a signal reproducing repeater is arranged on an upstream side of a detected location of the network fault of the OADM in the optical network, the recovery is performed by arranging at least one line terminator connected to the optical layer between the OADM and the signal reproducing repeater and sending a monitor signal issued by the signal reproducing repeater to the line terminator so that an occurrence of the network fault is noticed from the signal reproducing repeater to the line terminator when the signal reproducing repeater detects the network fault, by an optical path switching performed by the optical add-drop multiplexer in the optical layer according to a notice of the network fault to at least one of the optical repeater/amplifier on the downstream side of the signal reproducing repeater and the OADM or by a notice of network fault performed by a transmission line connected to the optical layer from the optical layer to the transmission line by converting the OLOS of the network fault in the optical layer into the AIS-O. Further, a network management information is assigned to a wavelength range different from a main signal wavelength range to be processed by the OADM to perform a network information communication between the nodes.

With these means, it is possible to the fault monitoring, the fault notice and the network information communication independently from framing format of the transmission device connected to the optical layer.

Further, it is possible, in an optical network including OADM's and optical repeaters/amplifiers each provided with the optical layer monitor and a line terminator of the SONET/SDH standard in which an optical signal wavelength-multiplexed with at least one wavelength in each optical fiber is processed and when a network fault is detected in the section layer of the SONET/SDH, to monitor the optical signal cut off fault in the network by at least one of the OLOS and the AIS-O in the optical layer instead of an AID-L in the SONET/SDH layer output again to the line terminator to notice the network fault to the line terminator by reading in the AIS-L assigned to a line overhead to notify the occurrence of the network fault to the line terminator on the downstream side of the location at which the network fault is detected.

When a network fault in the optical layer occurs in the optical network utilizing one of the OADM and the optical repeater/amplifier, it is possible to notice the network fault from the optical layer to the SONET/SDH layer by converting the OLOS into the AIS-O to intentionally detect the LOS by the line terminator.

In an optical network in which a network fault is monitored by using one of the OADM and the optical repeater/amplifier and using at least one of OLOS and AIS-O in the optical layer instead of the AIS-L in the SONET/SDH layer and the signal reproducing repeater of the SONET/SDH standard is arranged on the upstream side of the location of the OADM at which the network fault is detected, it is possible to recovery the network fault by arranging at least one of the line terminator of the SONET/SDH standard between the OADM and the signal reproducing repeater and activating an automatic protection system (APS) of the SONET/SDH standard by sending the AIS-L issued by the signal reproducing repeater to the line terminator so that the occurrence of the network fault is noticed from the signal reproducing repeater to the line terminator of the SONET/SDH standard on the downstream side when the network fault is detected by the signal reproducing repeater.

As another fault recovery function in the case where the signal reproducing repeater is arranged on the upstream side of the location of the OADM network at which the network fault is detected, the network fault is recovered by at least one of a switching of at least one of optical paths performed by the OADM in the optical layer according to a notice of the network fault to at least one of said optical repeater/amplifier and the OADM on the downstream side of said signal reproducing repeater and an APS of the SONET/SDH, which is performed by a notice of the network fault from the optical layer to the SONET/SDH layer by converting the OLOS of the network fault in said optical layer into the AID-I to notify the line terminator the detection of the LOS.

Further, the network information communication between the nodes in the optical network for monitoring the network fault by utilizing one of the OADM and the optical repeater/amplifier and using at least one of OLOS and AIS-O in the optical layer instead of the AIS-L in the SONET/SDH layer can be performed between the OADM's and between the OADM and the line terminator by assigning a network management information to a wavelength range different from a main signal wavelength range.

In a ring network having a plurality of OADM's each provided with an optical layer monitor connected in a ring by at least one transmission line, it is possible to recover a fault by detecting the fault by using at least one of OLOS and AIS-O and by at least one of a switching to a protect transmission line and a reconfiguration of network.

In these constructions, the fault is monitored by wavelength dividing a wavelength multiplexed light input to the OADM. In view of utilization of the OADM, however, a light intensity monitor which excludes spontaneously emitted optical noise component generated by the optical gate switch having the functions of detecting wavelength deviation of the signal newly added in the OADM and amplifying it is required. However, it is not sufficient to merely measure the light intensity and it is necessary to drop a portion of the wavelength multiplexed light output from the OADM, wavelength-divide the dropped portion and measure the light intensity of the respective wavelength divided lights.

In general, in order to monitor signal lights having different wavelengths, it is necessary to provide band-pass filters each allowing a light having specific wavelength, which causes the size and cost of the device to be increased. In view of this, the signal lights having respective wavelengths are derived from the wavelength-multiplexed light by utilizing the WDM coupler which is necessarily provided in the OADM for wavelength-multiplexing signal lights. In order to perform a monitor of such wavelength-multiplexed light, it is preferable to utilize an optical wavelength division multiplex coupler having two or more input ports and two or more output ports, and having a function of wavelength multiplexing signal lights input from a plurality of optical transmission lines, a function of wavelength-dividing a wavelength multiplexed light input from an optical transmission line to wavelength lights having different wavelengths and an optical router function of providing a regular correlation between the optical input ports and the optical output ports for every wavelength to wavelength-multiplex signal lights input from a plurality of optical transmission lines, to drop a portion of a wavelength-multiplexed light output to an optical transmission line, to input the dropped portion to the optical wavelength division multiplex coupler again and to monitor lights output therefrom.

With the latter construction, the wavelength-multiplexed light output from the optical wavelength division multiplex coupler is branched by an optical coupler to a transmission light to be transmitted to a succeeding node and a monitor light to be monitored. The monitor light is input the optical wavelength division multiplex coupler again. The re-divided monitor lights are input to the respective optical transmission lines in the nodes in a direction opposite to the direction of the transmission light and the monitor light is output to the light monitor by an optical coupler provided in the transmission line. Since the monitor light is passed through the optical wavelength division multiplex coupler having a narrow pass band, it is possible to monitor wavelength deviation and to measure a level of light containing no spontaneously emitted optical noise component. That is, since the system of the present invention does not require band-pass filters or the optical wavelength division coupler for the optical monitor, it is possible to realize an optical monitor of low cost.

BRIEF DESCRIPTION OF THE DRAWINGS

Preferred embodiments of the present invention will be described in detail with reference to the accompanying drawings, in which.

DETAILED DESCRIPTION OF THE PREFERRED EMBODIMENTS

Figure 1:
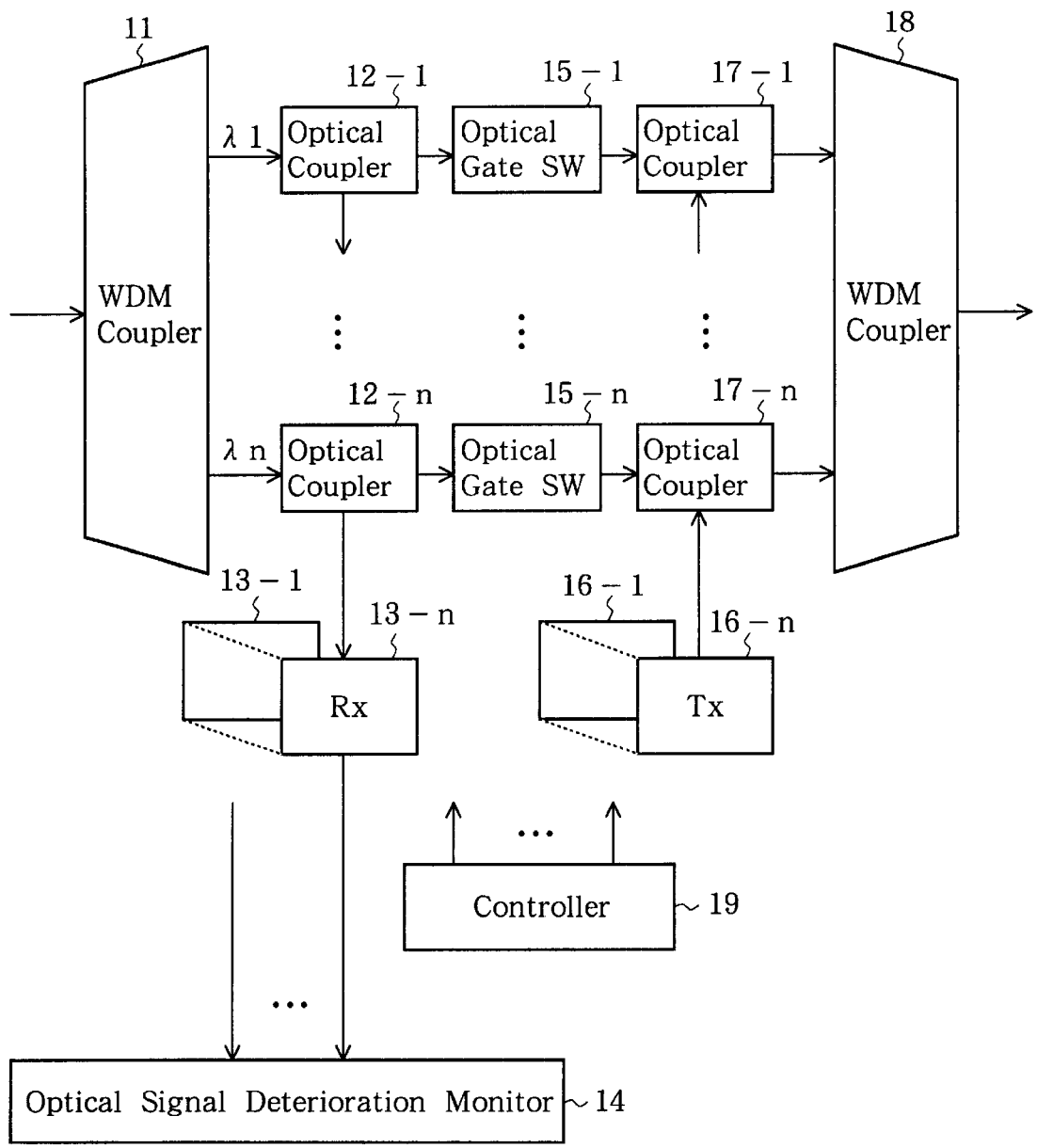
FIG. 1 is a block diagram showing a first embodiment of the present invention.

An OADM according to a first embodiment shown in FIG. 1 constitutes a node in a network and, in order to drop (branch)/add (insert) wavelength light signals of a wavelength-multiplexed light in this node, respectively, includes an optical wavelength division coupler 11 for wavelength-dividing a wavelength-multiplexed light to wavelength lights having different wavelengths, optical couplers 12-1 to 12-n, light receivers 13-1 to 13-n, an optical signal deterioration monitor 14, optical gate switches 15-1 to 15-n, light transmitters 16-1 to 16-n, optical couplers 17-1 to 17-n, a controller 19 and an optical wavelength multiplex coupler 18 for wavelength-multiplexing lights having different wavelengths. The optical wavelength division coupler 11 and the optical wavelength multiplex coupler 18 are constituted by using array waveguide diffraction gratings, respectively. The optical couplers 12-1 to 12-n, the light receivers 13-1 to 13-n, the optical gateswitches 15-1 to 15 n, the light transmitters 16-1 to 16-n and the optical couplers 17-1 to 17-n are provided correspondingly to wavelength signals having different wavelengths which are obtained by wavelength-divided by the optical wavelength division coupler 11.

The optical wavelength division coupler 11 wavelength-divides an input wavelength-multiplexed light to respective wavelength signals and outputs the wavelength signals through the optical couplers 12-1 to 12-n to the light receivers 13-1 to 13-n and the optical gate switches 15-1 to 15-n, respectively. The light receivers 13-1 to 13-n receive the optical signals having the respective wavelengths, respectively. The optical signal deterioration monitor 14 monitors receiving conditions of the respective light receivers 13-1 to 13-n and notifies monitored receiving conditions to the controller 19 by predetermined signals. The optical gate switches 15-1 to 15-n switch the optical signals having the respective wavelengths between add and drop. The optical transmitters 16-1 to 16-n transmit the respective wavelength optical signals under control of the controller 19. The optical couplers 17-1 to 17-n couple outputs of the optical gate switches 15-1 to 15-n with outputs of the optical transmitters 16-1 to 16-n, respectively, and output them to the optical wavelength multiplex coupler 18. The controller 19 controls usual functions in the OADM and controls operations of the respective constructive components, including cut-off of downward optical signal transmission by turning the optical gate switch or switches off on the basis of the optical signal cut-off monitor signal input from the optical signal deterioration monitor 14.

These operations will be described in more detail with reference to a case where n is 4 and four signal lights having wavelengths $\lambda 1=1548$ nm, $\lambda 2=1550$ nm $\lambda 3=1552$ nm and $\lambda 4=1554$ nm are wavelength-multiplexed.

The wavelength-multiplexed optical signal containing the four signal lights having wavelengths $\lambda 1=1548$ nm, $\lambda 2=1550$ nm, $\lambda 3=1552$ nm and $\lambda 4=1554$ nm is input to the optical wavelength division coupler 11 which wavelength-divides the wavelength-multiplexed signal to the four signal lights and outputs them to the optical couplers 12-1 to 12-n, respectively. That is, each of the optical couplers 12-1 to 12-n receives only a wavelength light having a certain different wavelength. Considering the signal light having wavelength $\lambda 1$, a portion of this signal light is dropped by the optical coupler 12-1 and received by the light receiver 13-1. In a case where the OADM allows this signal light to pass through, the signal light passes from the optical coupler 12-1 through the optical gate switch 15-1 and the optical coupler 17-1 to the optical wavelength multiplex coupler 18. On the contrary, in a case where the OADM drops the signal light having wavelength $\lambda 1$ to prevent it from being transferred to a downstream node and/or adds a new signal to transfer it to a downstream node, the optical gate switch 15-1 is turned off under control of the controller 19 to prevent the signal from being output to the optical coupler 16-1 while supplying the signal light having wavelength $\lambda 1$ output from the optical transmitter 16-1 (in the case of drop, loss of signal (LOS)) to the optical wavelength multiplex coupler 18 through the optical coupler 17-1 under control of the controller 19. This is also true for other wavelength $\lambda 2$ to $\lambda 4$ and it is possible to drop/add an optical signal having arbitrary wavelength within the node.

Figure 2:
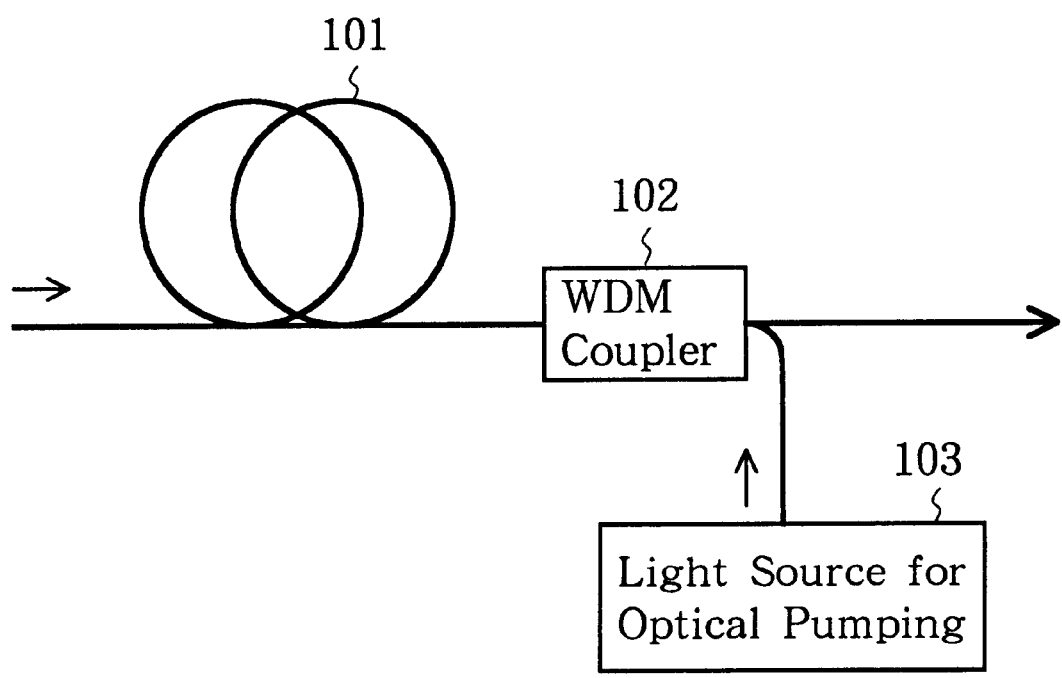
FIG. 2 is a block diagram showing a construction of an EDFA gate switch.

Each of the optical gate switch 15-1 to 15-n may be an Erbium doped fiber amplifier (EDFA) gate switch shown in FIG. 2. The EDFA gate switch is constructed with an Erbium doped fiber (EDF) 101, a wavelength division multiplex (WDM) coupler 102 which has functions of both a wavelength division coupler and a wavelength multiplex coupler and an optical pumping light source 103 and the signal light is input from the optical transmission line to the EDF 101. Pumping light output from the pumping light source 103 is input through the WDM coupler 103 to the EDF 101. The EDFA gate switch thus constructed can be on/off controlled and can regulate an optical level of the output signal light, under control of pumping light intensity of the pumping light source 103.

The optical signal deterioration monitor using the OADM described above will be described in more detail.

While, in the SONET/SDH, the monitoring is performed in frame unit, that is, signal is monitored on a time axis, a main signal in an optical layer is monitored on a wavelength axis and it is possible to deal with a high rate optical signal in Gb/s class, in the present invention. In more detail, the pull-out in time is monitored on the basis of loss of frame (LOF) or loss of pointer (LOP), the signal cut-off is monitored on the basis of loss of signal (LOS) and the degradation of signal quality is monitored on the basis of bit error rate (BER) in the SONET/SDH layer, while, in the present invention, the optical loss of wavelength (OLOW) is monitored on the basis of an S/N ratio of an optical signal passed through an optical band-pass filter (BPF) or an intensity thereof, the optical los of signal (OLOS) is monitored on the basis of light intensity or optical S/N ratio and an optical signal degrade (OSD) is monitored on the basis of optical S/N ratio. These faults are monitored by the optical signal deterioration monitor 14 shown in FIG. 1.

When a fault of line within the network occurs, the fault is noticed downstream by line alarm indication signal (AIS-L) in the SONET/SDH, while, in the present invention, the network elements detecting the OLOW, OLOS and OSD, that is, the optical signal deterioration monitor 14 and the controller 19 shown in FIG. 1, notice the occurrence of the fault by cutting their optical outputs off That is, when the light output is cut off by the network element, network elements on the downstream side of the network element detect the loss of signal (LOS) as the optical alarm indication signal (AIS-O).

In this manner, the line terminator of the SONET/SDH detects the LOS finally and it is possible to notice the network fault from the optical layer to SONET/SDH layer by this detection of AIS-O. This sequence of AIS propagation is equivalent to the case where the network element which detects OLOS, OLOW or OSD converts it into AIS-O in the optical layer and notices it to the line terminator of the SONET/SDH layer.

The recovery from the fault can be performed by switching the protection switches of the respective nodes according to the reception of the optical signal cut-off monitor signal. This can be realized by a simple hardware construction and is advantageous in reduction of system size and cost thereof.

A second embodiment of the present invention will be described with reference to FIG. 3. The OADM of this embodiment is constructed with an optical WDM coupler 21, optical couplers 22-1 to 22-n bi-directionally connected to the optical WDM coupler 21, light receivers 23-1 to 23-n connected to outputs of the respective optical couplers 22-1 to 22-n, light transmitters 24-1 to 24-n, optical couplers 25-1 to 25-n bi directionally connected to the respective optical couplers 22-1 to 22-n and receiving outputs of the respective light transmitters 24-1 to 24-n, optical gate switches 26-1 to 26-n bi-directionall y connected to the respective optical couplers 25-1 to 25-n, reflection mirrors 27-1 to 27 n bi-directionally connected to the respective optical couplers 26-1 to 26-n, a circulator 28 and a controller 29.

The second embodiment differs from the first embodiment in that the wavelength-multiplexed input light is input through the circulator 28 to the optical WDM coupler 21, that signal lights having different wavelengths, which are obtained by wavelength-dividing the wavelength multiplexed input light by the optical WDM coupler 21, are reflected by the respective mirrors 27-1 to 27-n back to the optical WDM coupler 21 and wavelength-multiplexed thereby and that the resultant wavelength multiplexed optical signal is output through the circulator 28 to another transmission line.

The signal light input to the OADM of this embodiment is input through the circulator 28 to the optical WDM coupler 21. The optical WDM coupler 21 functions to wavelength-divide the input wavelength-multiplexed light to optical signals having wavelengths $\lambda 1$ to $\lambda n$ and output them to the optical couplers 22-1 to 22-n, respectively, and to wavelength multiplex optical signals from the optical couplers 22-1 to 22-n and output the wavelength-multiplexed light to the optical circulator 28. Explaining this in more detail by taking the light signal having wavelength $\lambda 1$ as an example, the optical coupler 22-1 functions to output the signal light having wavelength $\lambda 1$ from the optical WDM coupler 21 to the optical receiver 23-1 and the optical coupler 25-1 and to send the signal light input from the optical coupler 25-1 to the optical WDM coupler 21. The optical coupler 25-1 outputs the signal light from the optical coupler 22-1 to the optical gate switch 26-1 and outputs the signal lights from the optical transmitter 24-1 and the optical gate switch 26-1 to the optical coupler 22-1. The optical gate switch 26-1 is arranged between the optical coupler 25-1 and the reflection mirror 27-1 and bi-directionally on-off controls light under the control of the controller 29. The reflection mirror 27-1 reflects light passed through the optical gate switch 26-1. The above operation is the same for the signal lights having other wavelength $\lambda 2$ to $\lambda n$.

In a case where the OADM allows a signal light having wavelength $\lambda 1$ to pass, the signal light is derived by the optical WDM coupler 21 and, after passed through the optical couplers 22-1 and 25-1 and the optical gate switch 26-1, reflected by the reflection mirror 27-1. The signal light reflected by the reflection mirror 27-1 passes through the optical gate switch 26-1 and the optical couplers 25-1 and 22-1 to the optical WDM coupler 21 and is output from the optical circulator 28. When the signal having wavelength $\lambda 1$ is to be dropped or added, the optical gate switch 26-1 is turned off under control of the controller 29 to cut the passage between the optical coupler 25-1 and the reflection mirror 27-1 and to input the signal light having wavelength $\lambda 1$ from the light transmitter 24-1 to the optical WDM coupler 21 through the optical couplers 25-1 and 22-1. This is the same for signal lights of other wavelength $\lambda 2$ to $\lambda n$. The light which is obtained by the wavelength multiplexing function of the optical WDM coupler 21 is output through the optical circulator 28. Thus, the drop/add of an optical signal having an arbitrary wavelength becomes possible within the node. Now, a third embodiment of the present invention will be described with reference to FIG. 4. An OADM of this embodiment comprises an optical WDM coupler 31, first optical couplers 32-1 to 32-n, light receivers 33-1 to 33-n, optical gate switches 34-1 to 34-n, optical isolators 35-1 to 35-n, second optical couplers 36-1 to 36-n, light transmitters 37-1 to 37-n, third optical couplers 38-1 to 38-n and a controller 39.

Figure 3:
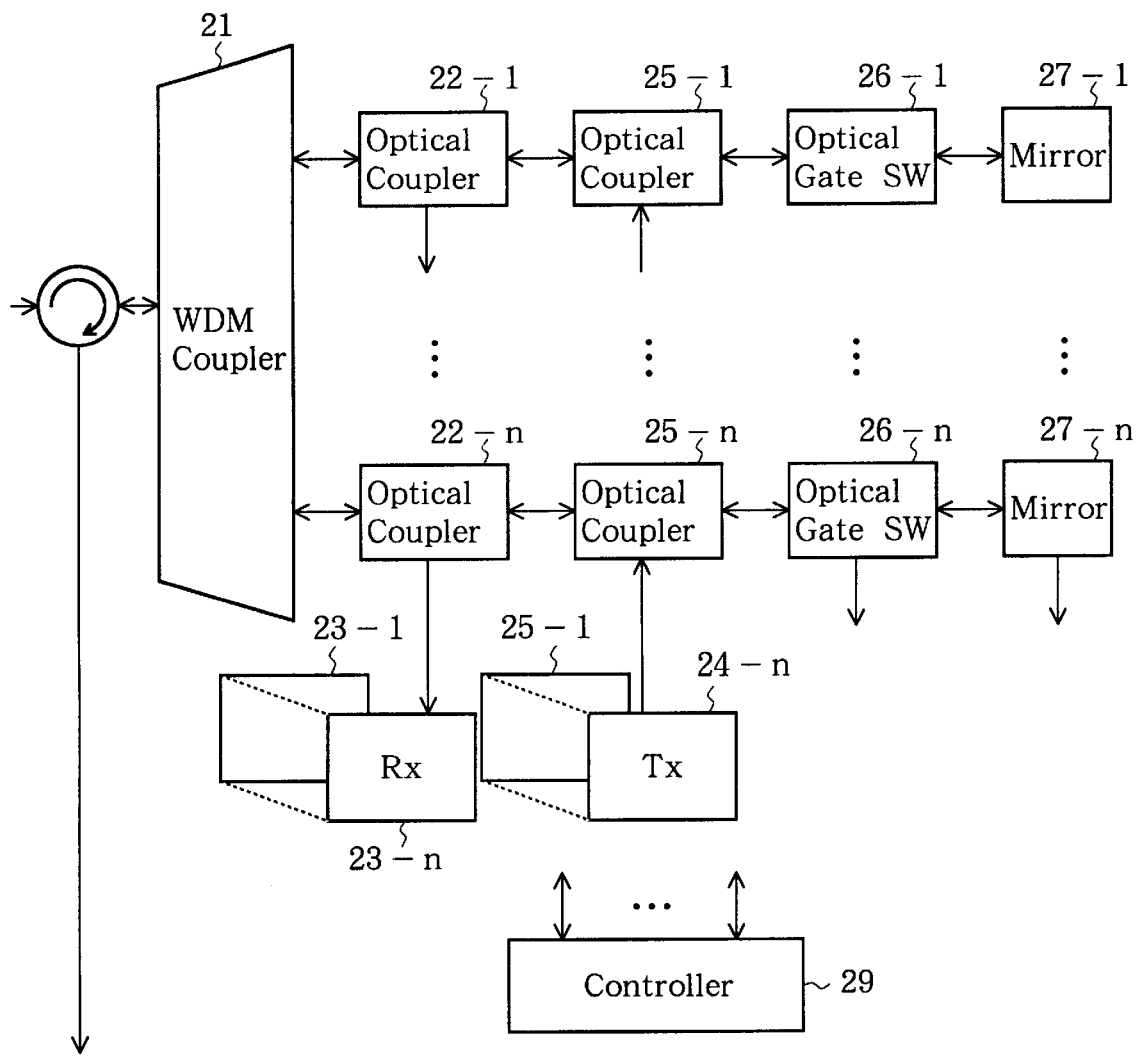
FIG. 3 is a block diagram showing a second embodiment of the present invention.
Figure 4:
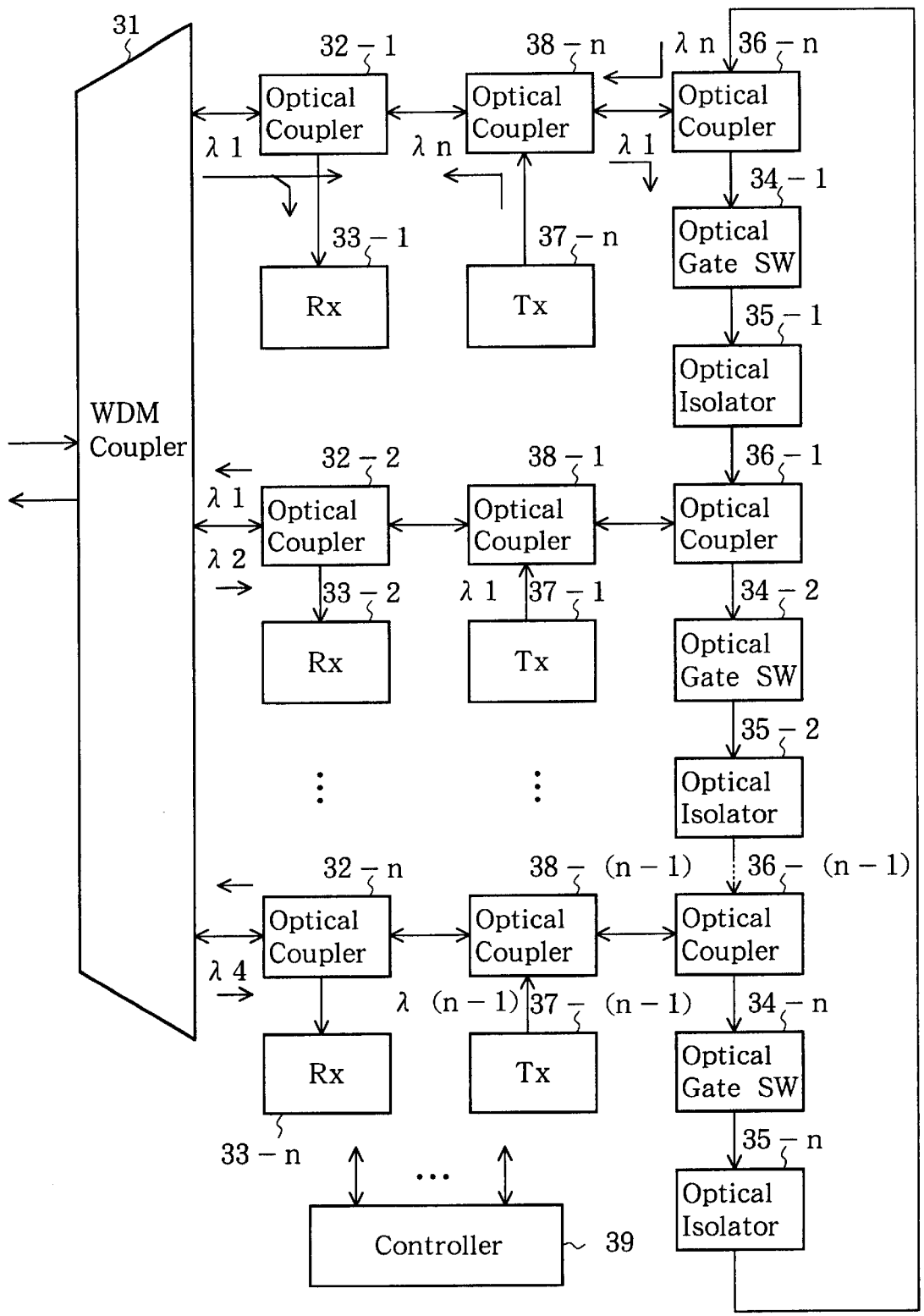
FIG. 4 is a block diagram showing a third embodiment of the present invention.

The third embodiment shown in FIG. 4 differs from the second embodiment shown in FIG. 3 in that wavelengths of optical signals output from respective ports of the optical WDM coupler 31 are different from wavelengths of optical signals input to the respective ports of the optical WDM coupler 31. That is, where i=1~n, the third optical coupler 38-(i-1) for inserting a light signal having wavelength $\lambda(i1)$(when i=1, i-1 is replaced by n) is connected to the first optical coupler 32-i for dropping a light signal having wavelength $\lambda i$, the second optical coupler 36-(i-1) is connected to the third optical coupler 38-(i-1) and the optical gate switch 34-1, the optical isolator 35-1, the second optical coupler 36-2, the optical gate switch 34-2, the optical isolator 35-2, . . . , the second optical coupler 36-(n-1), the optical gate switch 34-n and the optical isolator 35-n are connected in the order to form a loop connection.

The optical WDM coupler 31 separates optical signals having wavelength $\lambda 1$ to $\lambda n$ from the input wavelength-multiplexed light and outputs them to the respective first optical couplers 32-1 to 32-n and wavelength-multiplexes lights from the first optical couplers 32-1 to 32-n. Describing this in more detail by taking the light having wavelength as an example, the first optical coupler 32-1 outputs the light having wavelength $\lambda 1$ from the optical WDM coupler 31 to the optical receiver 33-1 and the third optical coupler 38-n and sends the light having wavelength $\lambda n$ from the third optical coupler 38-n to the optical WDM coupler 31. The third optical coupler 38-n outputs the light having wavelength $\lambda 1$ from the first optical coupler 32-1 to the second optical coupler 36-n and outputs the light having wavelength $\lambda n$ from the second optical coupler 36-n to the first optical coupler 32-1. The second optical coupler 36-n outputs the light having wavelength $\lambda 1$ from the third optical coupler 38-n through the optical gate switch 34-1 and the optical isolator 35-1 to the second optical coupler 36-1 and outputs the light having wavelength $\lambda n$ from the optical isolator 35-n to the third optical coupler 38-n. The optical gate switch 34-1 on-off controls the light from the first optical coupler 34-1 under control of the controller 39. The optical isolator 35-1 allows the light from the optical gate switch 34-1 to pass and cuts off the light from the first optical coupler 36-1. The above mentioned operation is the same for lights of other wavelengths.

In a case where the OADM allows the signal light having wavelength $\lambda 1$ to pass, this signal light is derived by the optical WDM coupler 31 and passed through the first optical coupler 32-1, the third optical coupler 38-n, the second optical coupler 36-n, the optical gate switch 34-1, the optical isolator 35-1, the second optical coupler 36-1, the third optical coupler 38-1 and the first optical coupler 32-2 and input back to the optical WDM coupler 31. When the light signal having wavelength $\lambda 1$ is to be dropped or added, the optical gate switch 34-1 is turned off under control of the controller 39 to guide the signal light having wavelength $\lambda 1$ from the light transmitter 37-1 through the third optical coupler 38-1 to the first optical coupler 32-2 and input it to the optical WDM coupler 31, under control of the controller 39.

When the signal light having wavelength $\lambda 2$ is to be passed, the signal light is sent through a loop constituted with the optical couplers 32-2, 38-1 and 36-1, the optical gate switch 34-2, the optical isolator 35-2 and the optical couplers 36-2, 38-2 and 32-3. This is similar for signal lights of wavelength $\lambda 3$ to $\lambda n$.

In this manner, it is possible to drop/add the optical signal having arbitrary wavelength within the node.

The monitoring of the optical signal fault by the OADM will be described with reference to FIG. 5. In this description, the previously described monitoring items OLOS, OLOW and OSD will be described in the order with reference to the OADM having the construction shown in FIG. 1.

Figure 5:
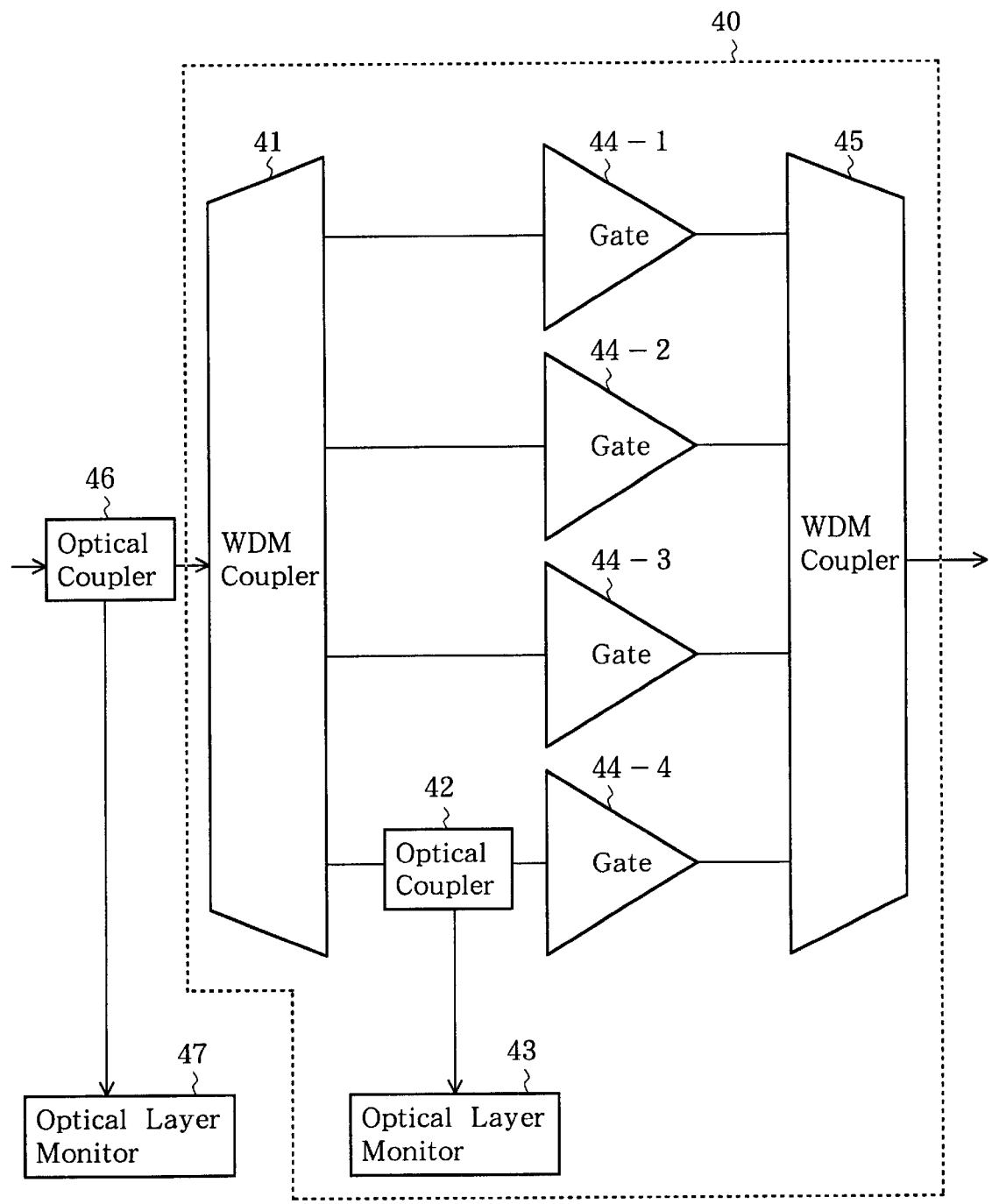
FIG. 5 is a block diagram showing a fourth embodiment of the present invention.

In FIG. 5, the OADM shown in FIG. 1 is simplified to an OADM 40 constructed with an optical wavelength division coupler 41, an optical coupler 42, an optical layer monitor 43, gates 44-1 to 44-4 and an optical wavelength multiplex coupler 45 and the optical coupling of only wavelength $\lambda 4$ (1554 nm) is shown. The optical layer monitor 43 corresponds to the optical signal deterioration monitor 14 shown in FIG. 1. Further, an optical coupler 46 for dropping a light signal input to the OADM 40 and an optical layer monitor 47 for monitoring the dropped wavelength-multiplexed light are shown in FIG. 5.

The signal light input to the OADM 40 is a wavelength-multiplexed signal obtained by wavelength-multiplexing four lights having wavelengths $\lambda 1$=1548 nm, $\lambda 2$=1550 nm, $\lambda 3$=1552 nm and $\lambda 4$=1554 nm. The wavelength-multiplexed light is input through the optical coupler 46 to the optical wavelength division coupler 41 and a portion thereof is dropped by the optical coupler 46 to the optical layer monitor 47 which monitors the intensity of the wavelength-multiplexed light The optical layer monitor 47 detects a communication fault due to breakage of fiber, etc., by detecting OLOS (optical loss of signal) from determination of existence of a signal light by calculating an optical S/N ratio on the basis of a ratio of intensity of light having wavelength in a wavelength range including at least the signal light to intensity of spontaneously emitted light having wavelength in a different wavelength range from the former wavelength range, or determination of existence of the signal light from intensity of light having wavelength in a certain wavelength range including wavelength of the signal light The wavelength-multiplexed light input to the optical wavelength division coupler 41 is wavelength-divided to the lights having respective wavelengths, which are output to the respective gates 44-1 to 44-4. In this case, a portion of a signal light having, for example, wavelength λ4 output from the optical wavelength division coupler 41 to the gate 44-4 is dropped by the optical coupler 42 as a monitor light which is input to the optical layer monitor 43.

The optical layer monitor 43 detects a communication fault due to wavelength deviation of the light source or the optical filter, etc., by detecting OLOW (optical loss of wavelength) by, on the basis of the pass-band width characteristics of the optical wavelength division coupler 41 and light intensity under monitor, calculating an optical S/N ratio from a ratio of intensity of light having wavelength in a wavelength range including at least wavelength of the signal light to intensity of spontaneously emitted light having a wavelength in a different wavelength range from the wavelength range and having similar width of the latter wavelength range or detecting OLOW (optical loss of wavelength) by monitoring the wavelength deviation of the signal light from the intensity of light having wavelength in that wavelength range.

The optical layer monitor 43 further detects a communication fault due to malfunction of communication equipments, etc., by calculating an optical S/N ratio from a ratio of intensity of light having wavelength in a wavelength range including at least wavelength of the signal light and having a certain width to intensity of spontaneously emitted light having wavelength in a different wavelength range from the wavelength range and having similar width of the latter wavelength range or detecting OSD (optical signal degrade) by monitoring a reduction of the optical S/N ratio to a value below a predetermined threshold value. In this manner, the monitoring in the optical layer can be realized by the optical layer monitors 43 and 47.

Figure 6:
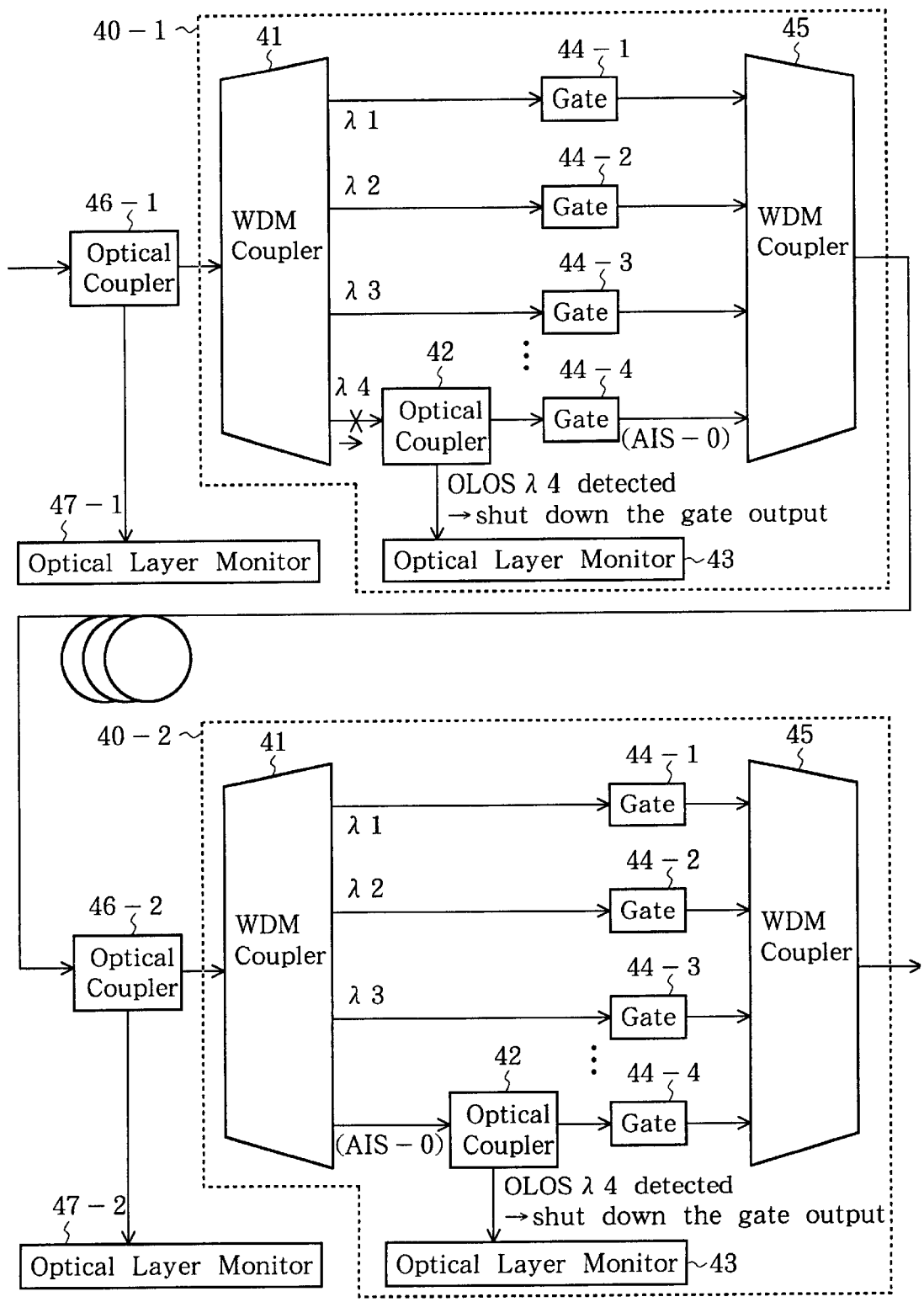
FIG. 6 is a block diagram showing a fifth embodiment of the present invention.

An operation of the present invention at a time of fault occurrence will be described with reference to FIG. 6. In FIG. 6, OADM's 40-1 and 40-2 each being identical to that shown in FIG. 5 are connected each other through a single optical transmission line. Similarly to the construction shown in FIG. 5, an optical coupler 46-1 and an optical layer monitor 47-1 are provided on an input side of the OADM 40-1 and an optical coupler 46-2 and an optical layer monitor 47-2 are provided on an input side of the OADM 40-2. Other constructive components than those mentioned above are omitted for simplicity of illustration.

It is assumed in FIG. 6 that a fault by which a downstream transmission of a signal light having wavelength λ4=1554 nm becomes impossible by a breakage of optical fiber in a signal path from the optical wavelength division coupler 41 to the optical coupler 42 in the OADM 40-1 occurs.

In such situation, the optical layer monitor 43 in the OADM 40-1, which is downstream from the location of the fault can not detect an optical input and the OLOS is detected. With the detection of the OLOS, the controller (not shown) in the OADM 40-1 issues AIS-O downward by turning the gate 44-4 off immediately to notify the occurrence of fault.

In the OADM 40-2 in the next node connected to the OADM 40-1 through the optical transmission line, an input signal light is a wavelength multiplexed light of λ1=1548 nm, λ2=1550 nm, λ3=1552 nm and λ4=1554 nm. However, since the gate output is cut off due to the breakage of the optical fiber in the OADM 40-1, the OLOS is also detected in the optical layer monitor 43 of the OADM 40-2. Therefore, the OADM 40-2 issues AIS-O downward by turning the gate 44-4 off.

In On the other hand, transmission lines for other wavelengths, in which no fault occurs, can perform active optical transmission regardless of the fault transmission line.

Thus, it is possible to notice a fault occurrence to the downstream side within the optical layer without influence on signal lights of other wavelengths by turning the gate switch immediately after the fault location off upon the detection of OLOS by the optical layer monitor of the OADM.

Another operation of the present invention at a time of fault occurrence will be described with reference to FIG. 7 which is the same as FIG. 6 except that the light transmitter 48 and the optical coupler 49 are added between the gate 44-4 and the optical coupler 45 in the OADM 40-1.

Figure 7:
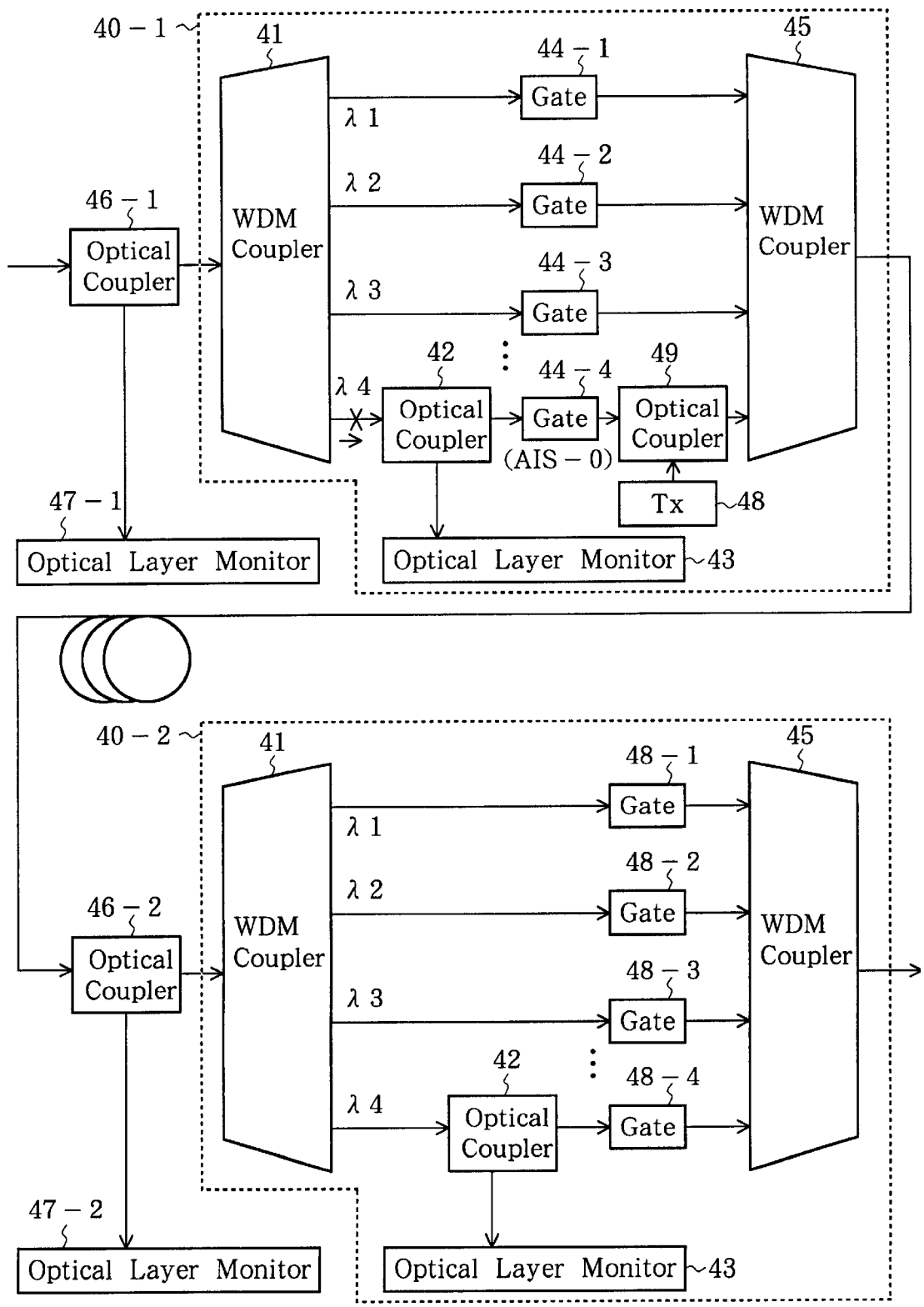
FIG. 7 is a block diagram showing a sixth embodiment of the present invention.

It is assumed in FIG. 7 that a fault by which a downstream transmission of a signal light of wavelength λ4=1554 nm becomes impossible by a breakage of optical fiber in a signal path from the optical wavelength division coupler 41 to the optical coupler 42 in the OADM 40-1 occurs. In such situation, the optical layer monitor 43 in the OADM 40-1, which is downstream from the location of the fault can not detect an optical input and the OLOS is detected. With the detection of the OLOS, the controller (not shown) in the OADM 40-1 issues AIS-O downward by turning the gate 444 off immediately to notice the occurrence of fault.

In this case, when the signal light of wavelength λ4=1554 nm is output from the light transmitter 48 through the optical coupler 49 to the optical wavelength multiplex coupler 45, OLOS is not detected by the optical layer monitor 43 of the OADM 40-2 of the next node. Although AIS-O is cut off by inserting the signal having the same wavelength in this manner, it is possible to detect the occurrence of fault and to notice it to the downstream side in the optical layer even during the drop/add operation without influencing signal lights of other wavelengths.

Figure 8:
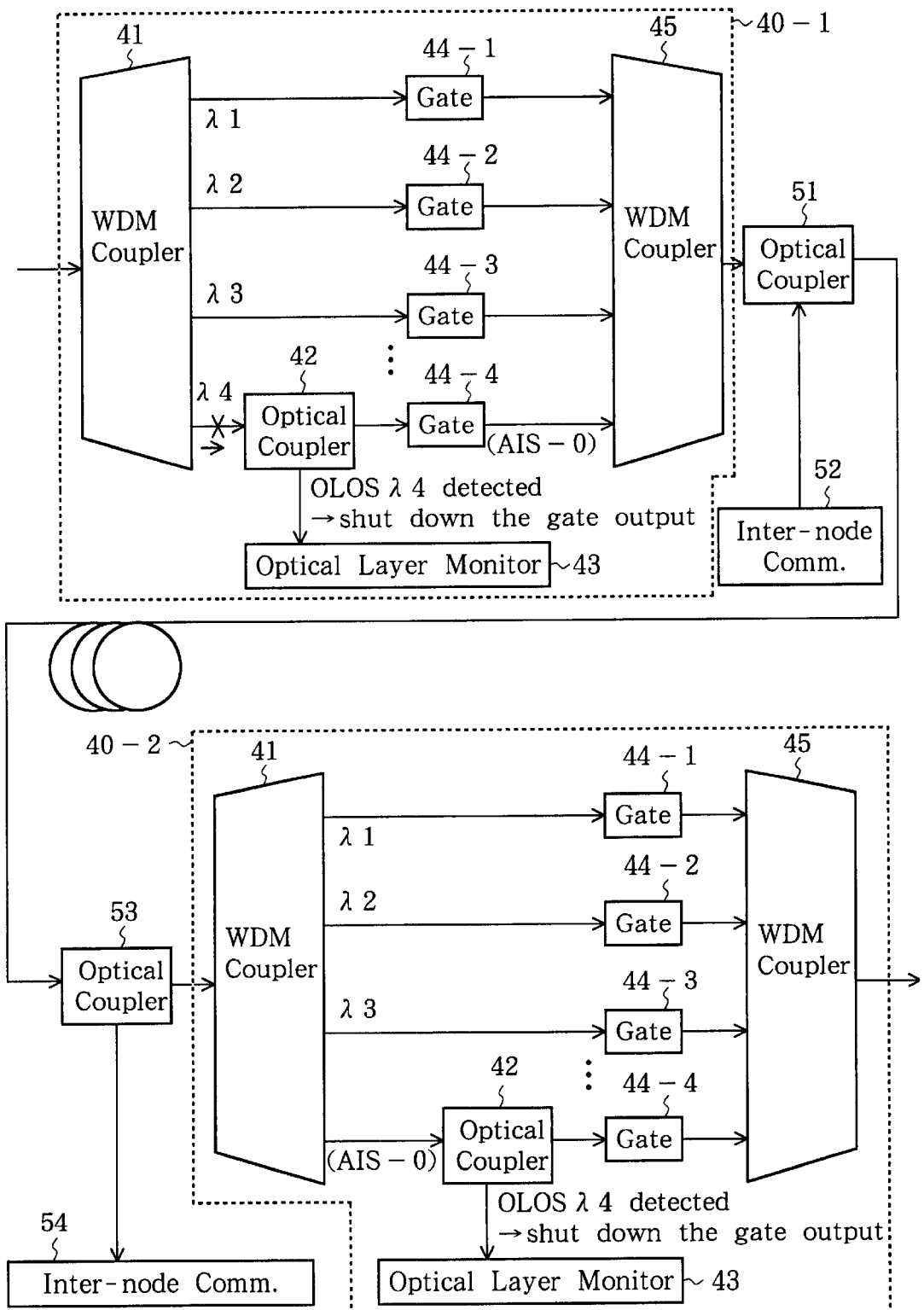
FIG. 8 is a block diagram showing a seventh embodiment of the present invention.

An example of notice of fault occurrence with using a different wavelength from those of signal lights between nodes will be described with reference to FIG. 8.

In this example, an optical coupler 51 and an inter-node communication device 52 are provided in an optical transmission line connecting between the OADM's 40-1 and 40-2 on the output side of the upstream side OADM 40-1 and an optical coupler 53 and an inter-node communication device 54 are provided in the optical transmission line on the input side of the downstream side OADM 40-2.

It is assumed that a fault by which a downstream transmission of a signal light of wavelength λ4=1554 nm becomes impossible by a breakage of optical fiber in a signal path from the optical wavelength division coupler 41 to the optical coupler 42 in the OADM 40-1 occurs. In such situation, the optical layer monitor 43 in the OADM 40-1, which is downstream from the location of the fault, can not detect an optical input and the OLOS is detected. With the detection of the OLOS, the controller issues AIS-O downward by turning the gate 534 off immediately to notice the occurrence of fault. On the other hand, it is possible to perform a communication of the network management information simultaneously with the notice of the fault occurrence by using a signal light having wavelength different from that of the above mentioned signal light between the inter-node communication devices 52 and 54.

Figure 9:
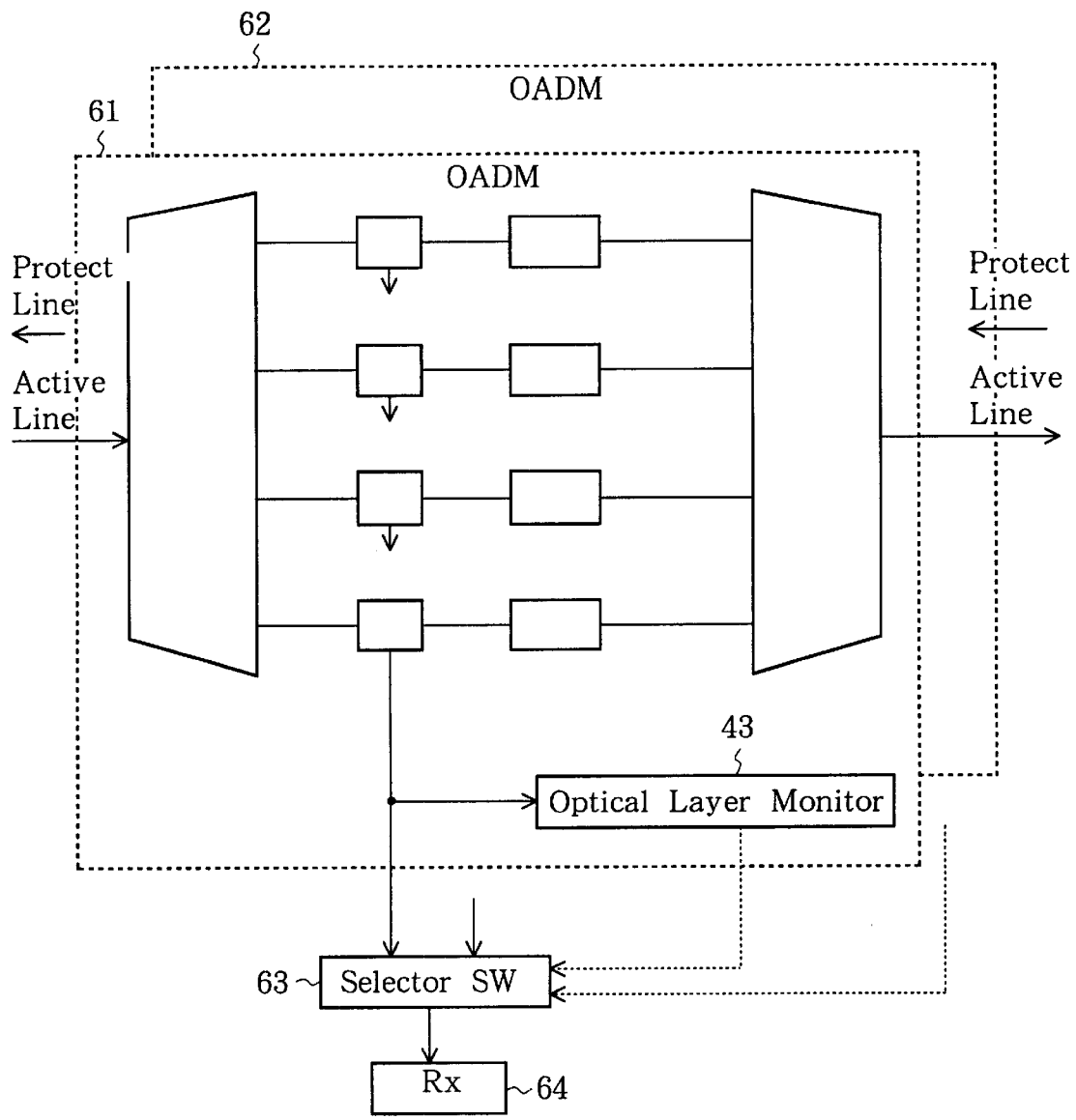
FIG. 9 is a block diagram showing an eighth embodiment of the present invention.

Now, the self-heeling by the above mentioned OADM will be described with reference to FIG. 9. In FIG. 9, a pair of OADM's 61 and 62 each being identical to that shown in FIG. 6 are provided in a node and an optical layer monitor 43 is provided in each of the OADM (the optical layer monitor 43 of the OADM 62 is not shown for simplicity of illustration). Further, a light receiver for receiving light of each wavelength (only the optical receiver 64 for wavelength λ4 is shown in FIG. 9) is commonly used by the OADM's 61 and 62 and, in order to select one of the OADNTs, a selector switch 63 is provided.

As shown in FIG. 9, signals are transmitted in opposite directions through optical transmission lines connected to the respective OADM's 61 and 62. One of the optical transmission lines is used as active line and the other transmission line is a protect line. In FIG. 9, the optical transmission line connected to the OADM 61 is used for active communication and that connected to the OADM 62 is used as protect line. In this case, the selector switch 63 connects the signal of the OADM 61 to the optical receiver 64.

In a usual state, light signals having respective wavelengths are input to the optical layer monitors 43 of the respective OADM'S 61 and 62 and OLOS, OLOW, OSD or AIS-O due to fault occurrence are monitored thereby. In a case where an optical signal cut-off fault signal is detected by the optical layer monitor 43 of the OADM 61 while the fault signal is not detected by the optical layer monitor 43 of the OADM 62, the selector switch 63 switches the connection of the optical receiver 64 from the active line side to the protect line side. Therefore, it is possible to realize the self-heeling network in the optical layer even when the fault occurs.

Although four wavelengths are optically multiplexed in the foregoing description, the number of wavelengths to be multiplexed is not limited thereto and an arbitrary number of wavelengths such as 8, 16, 32 or 64 may be multiplexed. Further, the wavelength of the input light is not limited to the 1550 nm band and any wavelength band such as 1300 nm band may be set therefor. Further, the signal bit rate is not specifically defined and can be freely set to, for example, 2.5 Gbps, 5 Gbps or 10 Gbps.

The optical WDM coupler used as the optical wavelength division coupler (11, 41), the optical wavelength multiplex coupler (18, 45) or the optical WDM coupler (21, 31) has been described as constituted with the arrayed waveguide diffraction grating, it may be a wavelength router having a grating structure which has a similar function to that of the optical WDM coupler or a combination of an optical coupler and an interference fringe film filter, which has a similar function to that of the optical WDM coupler. When the losses of insertion of the respective wavelengths in the optical WVDM coupler are different, it is possible to regulate the optical level for each wavelength by inserting optical attenuators into respective waveguides, by controlling gains of the respective optical gate switches, by controlling a gain of a newly provided semiconductor optical amplifier or by controlling the reflectivity of the mirrors in, particularly, the case shown in FIG. 3.

The optical gate switch is not limited to one using EDF and a construction in which an aluminum or tellurium doped fiber is used and an optical amplification is performed by pumping it by a pumping light source may be used. Alternatively, a semiconductor optical amplifier may be used therefor. Further, a mechanical switch having high on/off ratio or a gate switch such as LiNbO3 switch or quartz switch may be utilized therefor.

As described hereinbefore, according to the present invention, an OADM which makes a drop/add of signal light having arbitrary wavelength possible in a node can be realized. The reason for this is that the equalization of optical levels of the respective wavelengths can be realized by using the optical wavelength division coupler and the optical wavelength multiplex coupler, performing the drop/add of the signal light in the transmission lines provided for the signal lights of the respective wavelengths and utilizing the optical amplifiers and the optical attenuators.

Further, it is possible to reduce the amount of hardware to be mounted on the OADM and hence to reduce the size of the system and the cost thereof. The reason for this is that hardware for MIS processing becomes unnecessary in the OADM by re-defining the optical signal cut off fault detection signals (OLOS, OLOW, OSD and AIS-O) in the optical layer correspondingly to the alarms (LOS, LOF, LOP, BER and AIS-O) in the SONET/SDH layer and the control of the OADM can be simplified since the AIS processing control becomes unnecessary.

Further, it is possible to maintain the compatibility with the APS of the existing SONET/SDH standards. The reason for this that, since a network fault detected by at least one optical signal cut-off fault detection signal of OLOS, OLOW and OSD in the optical layer is converted into AIS-O and detected similarly to the conventional LOS for the SONET layer, the line terminator can identify the fault detected in the optical layer and recover the fault.

Further, it is possible to introduce the monitoring system and the fault recovery system in the optical layer into the existing network or a future network without conflict with transmission device according to not only the SONET/SDH standards but also other framing formats, that is, independently from frame format. The reason for this is that AIS-O in the optical layer is noticed to the downstream side by the cut-off of an optical signal transmission.

Now, the optical gate switch using an impurity doped fiber will be described in more detail. It has been known that the impurity doped fiber, particularly, EDF, amplifies a signal light under an existence of pumping light. However, since it has no function of cutting the signal light, a use of the EDF as an optical switch has not been considered. The present inventors have found that it is possible to obtain high on/off ratio since, although the insertion loss is large if incident light intensity is lower than a certain level in no pumping light state, the incident light is amplified when there is the pumping light.

Figure 10:
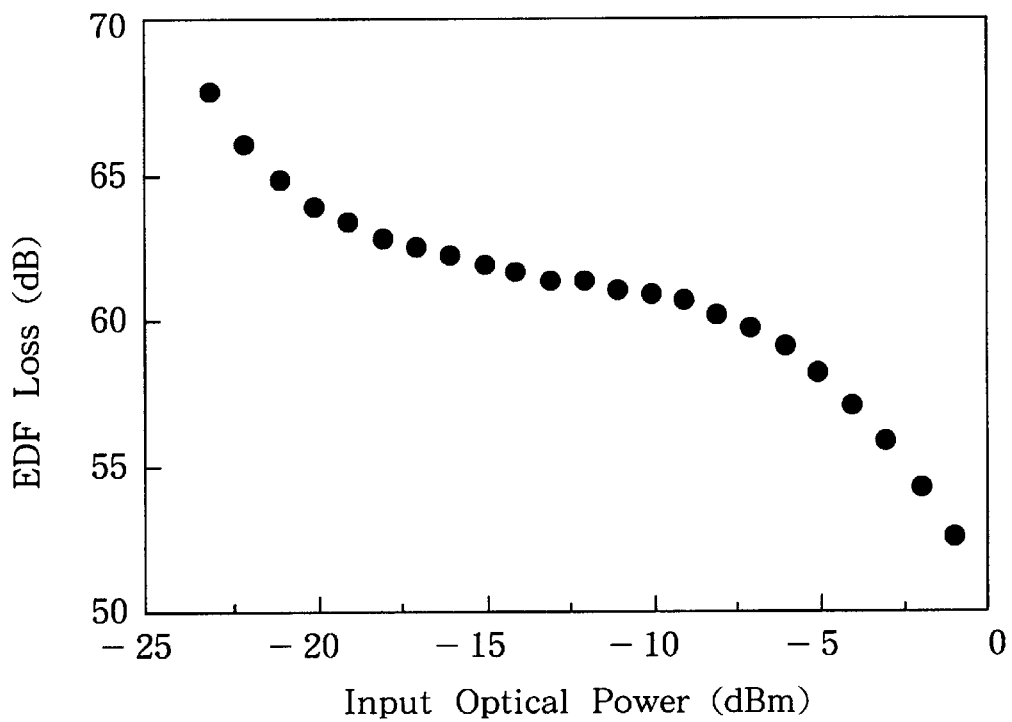
FIG. 10 shows a result of measurement of incident light power dependency of optical loss in EDF.
Figure 11:
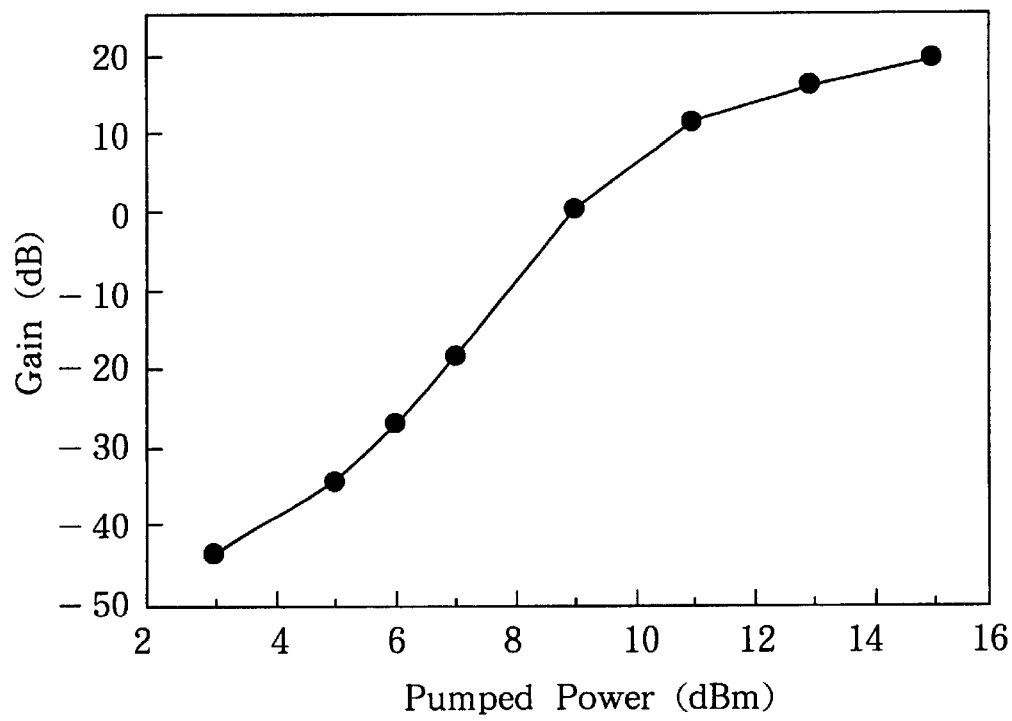
FIG. 11 shows a result of measurement of exciting light power dependency with respect to gain of optical switch.

FIG. 10 is a plot showing a result of measurement of the optical power dependency of the EDF. In this measurement optical loss was measured with respect to a variation of the incident light power by using, in the construction shown in FIG. 2, the EDF 101 which is 50 m long and the incident light which has wavelength of 1550 nm. It is clear from this result that, when the incident light power is −1 dB or less, the insertion loss of 50 dB or more is obtained. Therefore, it is clear that if a sufficient gain is obtainable by pumping light, it is possible to obtain high on/off ratio, that is, low cross-talk characteristics by on-off controlling the pumping light FIG. 11 is a plot showing a result of measurement of the optical power dependency of the gain of EDF. In this measurement a variation of gain was measured with respect to a variation of the incident light power by supplying light having intensity of −10 dB and wavelength of 1550 nm to the EDF 101 used in the measurement shown in FIG. 2. It is confirmed from this result that, by controlling the pumping light power, it is possible to realize an optical switch capable of freely setting the amount of insertion loss.

For the control of pumping light power, there are various methods such as control method for controlling injection current of the pumping light source 3 or control method for controlling the power by a variable or fixed attenuator.

Figure 12:
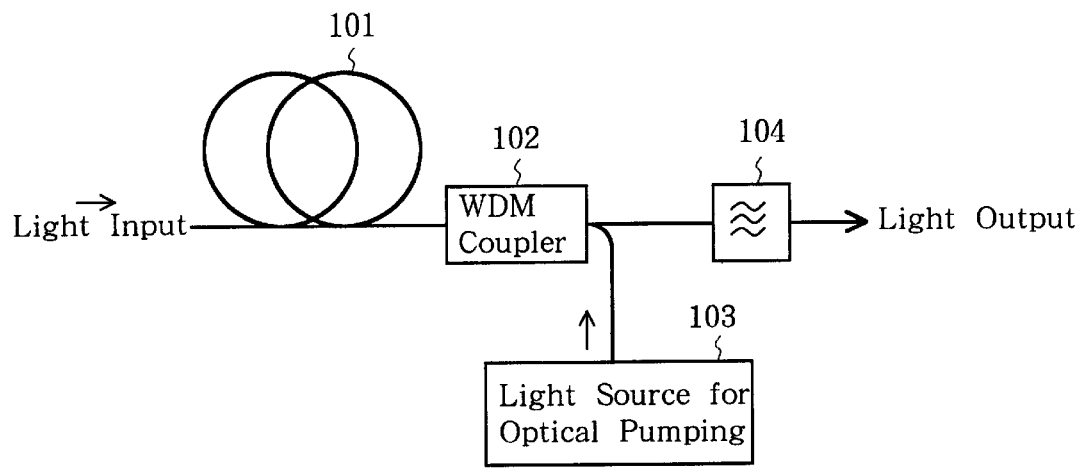
FIG. 12 shows a modification of the optical switch shown in FIG. 2.

That is, under the condition that the signal light of wavelength of 1550 nm and intensity of −10 dB is input to the EDF 101 and the pumping light of wavelength of 1480 nm is input thereto from the pumping light source 103 in the construction of the OADM shown in FIG. 2, when the supply of pumping light to the EDF 101 is stopped, the signal light of wavelength of 1550 nm is absorbed by the EDF 101 and it becomes in off state as the optical gate switch. On the other hand, when the pumping light power is 9 dBm, the insertion loss becomes 0 dB and the optical gate switch becomes in on state without insertion loss. At the pumping light power of 15 dBm, the insertion loss becomes about 20 dB and an output light of about −10 dBm is obtained, so that the optical gate switch becomes in on state with optical amplification. Thus, the optical switch having low cross-talk characteristics and on/off ratio of 60 dB or more is realized, FIG. 12 shows an example in which an optical filter 104 for passing only the signal light is provided on the output side of an EDF. In this construction, a signal light having wavelength of 1550 nm is input through an optical transmission line to the EDF 101 and a pumping light having wavelength of 1480 nm is input from a pumping light source 103 through an optical coupler 102 to the EDF 101. The signal light is amplified by the EDF 101 and then output through the optical filter 104 having a pass-band half value width of 0.3 nm. In this case, since spontaneously emitted optical noise component generated by the optical amplification in the EDF 101 is removed, a good S/N ratio can be obtained. This fact was confirmed by a monitoring of spectrum of the output signal light.

Figure 13:
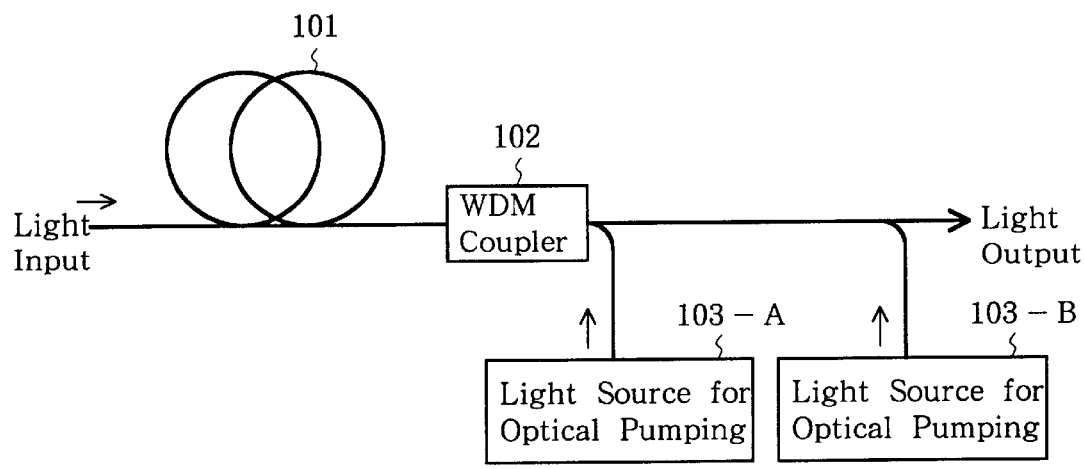
FIG. 13 shows another modification of the optical switch.

Further, it may be possible to connect a plurality of pumping light sources in parallel, to polarization-multiplex pumping lights from these pumping light sources and to input the polarization-multiplexed light to the EDF as shown in FIG. 13 in which two pumping light sources 103A and 103B are shown. By the polarization multiplexing, it becomes possible to obtain high gain.

Figure 14:
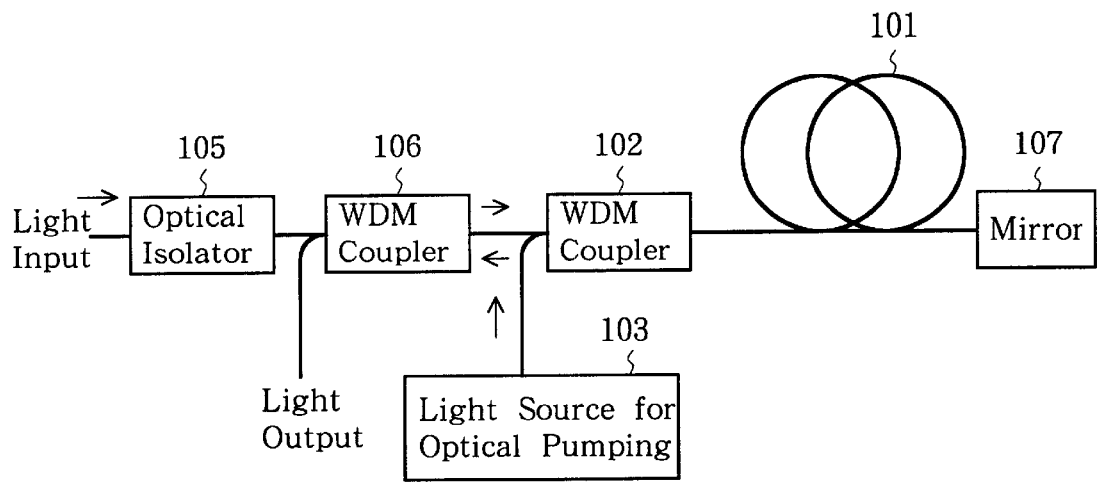
FIG. 14 shows a further modification of the optical switch.

In an example shown in FIG. 14, an optical coupler 102 and a pumping light source 103 are arranged in the input side of an EDF 101, a second optical coupler 106 is inserted into an upstream side thereof and an optical isolator 105 for passing an input light is inserted into an upstream side of the second optical coupler 106. Further, a mirror 107 for reflecting the output light of the EDF 101 back to the EDF 101 is arranged on the output side of the EDF 101. An optical transmission line for output light is connected to the optical coupler 106.

In this example, a signal light having wavelength of 1550 nm is input to the EDF 101 through the optical isolator 105, the optical couplers 106 and 102. On the other hand, a pumping light output from the pumping light source 103 and having wavelength of 1480 nm is input to the EDF 101 through the optical coupler 102. The signal light is optically amplified by output from the EDF 101, reflected by the mirror 107 provided on the output side of the EDF 101 back to the latter, optically amplified thereby again, past through the optical coupler 102 and then output to the optical transmission line connected to the optical coupler 106.

Therefore, in this example, the signal light can be optically amplified twice by the EDF 101, so that an optical amplification can be done with smaller pumping light. Further, since, when the supply of pumping light to the EDF 101 is stopped, the signal light of wavelength 1550 nm is absorbed by the EDF 101, an on-off operation of an optical switch is realized. The on/off ratio is 60 dB or more in this case, enabling an optical switching with low cross-talk. It may be possible to use a variable reflectivity mirror as the mirror 107, in order for the mirror to be applied to an output optical power control.

Figure 15:
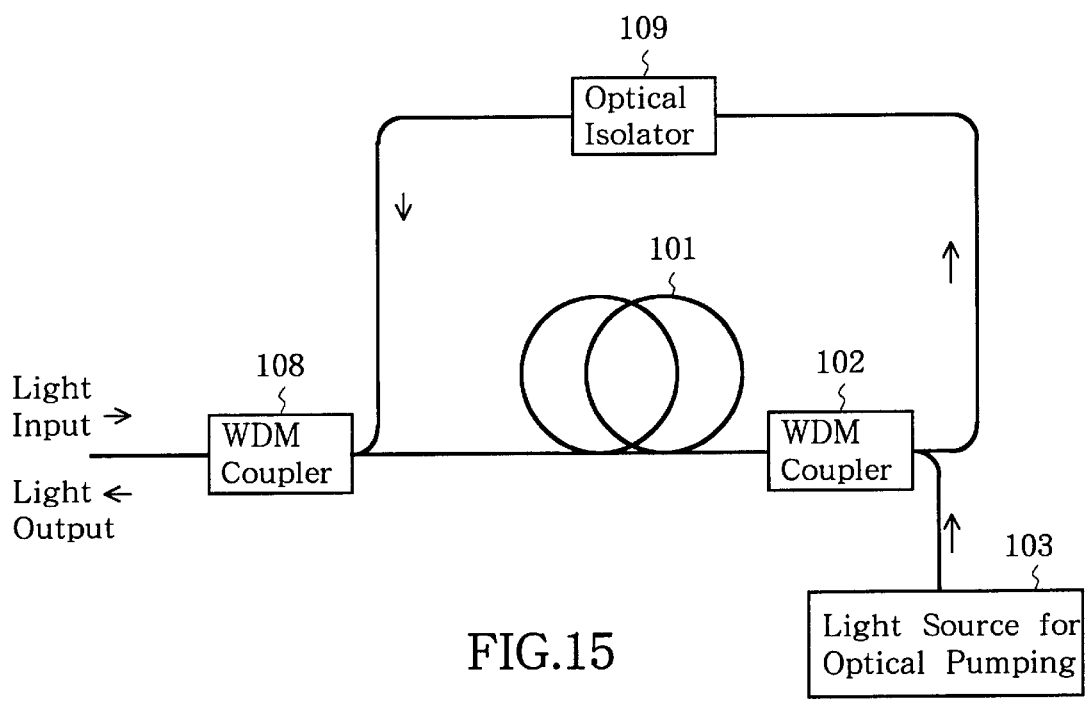
FIG. 15 shows a still further modification of the optical switch.

In an example shown in FIG. 15, an optical coupler 102 is inserted into an output side of an EDF 101 and a second optical coupler 108 is inserted into an input side of the EDF 101. A pumping light source 103 is connected to the optical coupler 102 and the optical transmission line on an optical output side of the optical coupler 102 is connected to an optical coupler 108 through an optical isolator 109.

In this example, a signal light having wavelength of 1550 nm is input to the EDF 101 through the optical coupler 108. On the other hand, a pumping light output from the pumping light source 103 and having wavelength of 1480 nm is input to the EDF 101 through the optical coupler 102. The signal light is optically amplified by the EDF 101 and input to the optical coupler 108 through the optical isolator 109. Then, the signal light is output to the same optical transmission line from the optical coupler 108 in the opposite direction. When the supply of pumping light to the EDF 101 is stopped, the signal light of wavelength 1550 nm is absorbed by the EDF 101. With this operation, it becomes possible to control the on-off operation of an optical switch. In this embodiment the on/off ratio of the optical switch of 60 dB or more was measured by a measurement of a branched output light, realizing an optical switching with low cross-talk.

Although, in the above description of the optical gate switch, the input light wavelength is in 1550 nm band, the wavelength of the input light is not limited thereto and it is possible to utilize a signal light in an arbitrary wavelength band such as 1330 nm band. Further, although the case where the input signal and the output signal have identical wavelengths has been described by taking the use of the optical gate switch in the OADM into consideration, the optical gate switch can be used in a case where a plurality of signal light having different wavelengths are wavelength-multiplexed and the number of wavelengths can be set to an arbitrary number such as 8, 16, 32 or 64. With such wavelength multiplexing, it may be possible to perform a total switching of the wavelength multiplexed light.

Further, although, in the described construction of the optical gate switch, the impurity doped fiber is EDF, other optical fibers for optical amplification, which are doped with other impurities than erbium, such as tellurium, can be utilized and the length of the fiber and the amount of impurity can be set freely correspondingly to the specifications of optical switch. Further, the wavelength of the pumping light source is not limited to 1480 nm and it may be 980 nm. The wavelength of the pumping light source can be set suitably according to the wavelength of signal light and the kind of impurity doped optical fiber.

Further, the optical branching ratio of the respective optical couplers used in each example of the optical gate switch constructions can be set to 1:1 or 1:10, etc., arbitrarily in the optical level design in the optical switch.

Further, in order to prevent the pumping light and/or the returning light from influencing on the input side and/or output side of the optical circuit, it is possible to is suitably arrange an optical filter and/or an optical isolator in an optical transmission line. It is possible to make an input light transmission line and an output light transmission common or different arbitrarily according to using condition thereof in the system. Further, the combination of an optical isolator and an optical coupler may be replaced by an optical circulator. Further, the pass band width of the optical filter 104 shown in FIG. 12 is not limited to the described value and can be suitably changed according to the number of signal lights passing through the optical switch.

As described, since, according to the present invention, the on-off operation of the signal light input to the optical transmission line on the input side is controlled by controlling the pumping light source to control the intensity of the pumping light input to the impurity doped fiber and the light intensity of the signal light output to the optical transmission line on the output side is controlled by controlling the intensity of the pumping light during the on state of the signal light, it becomes possible to realize an optical switch which is low cross-talk and high output power and having an input/output construction which can be freely designed according to system demand.

Next, the monitoring of a wavelength multiplexed light multiplexed in the OADM will be described.

Figure 16:
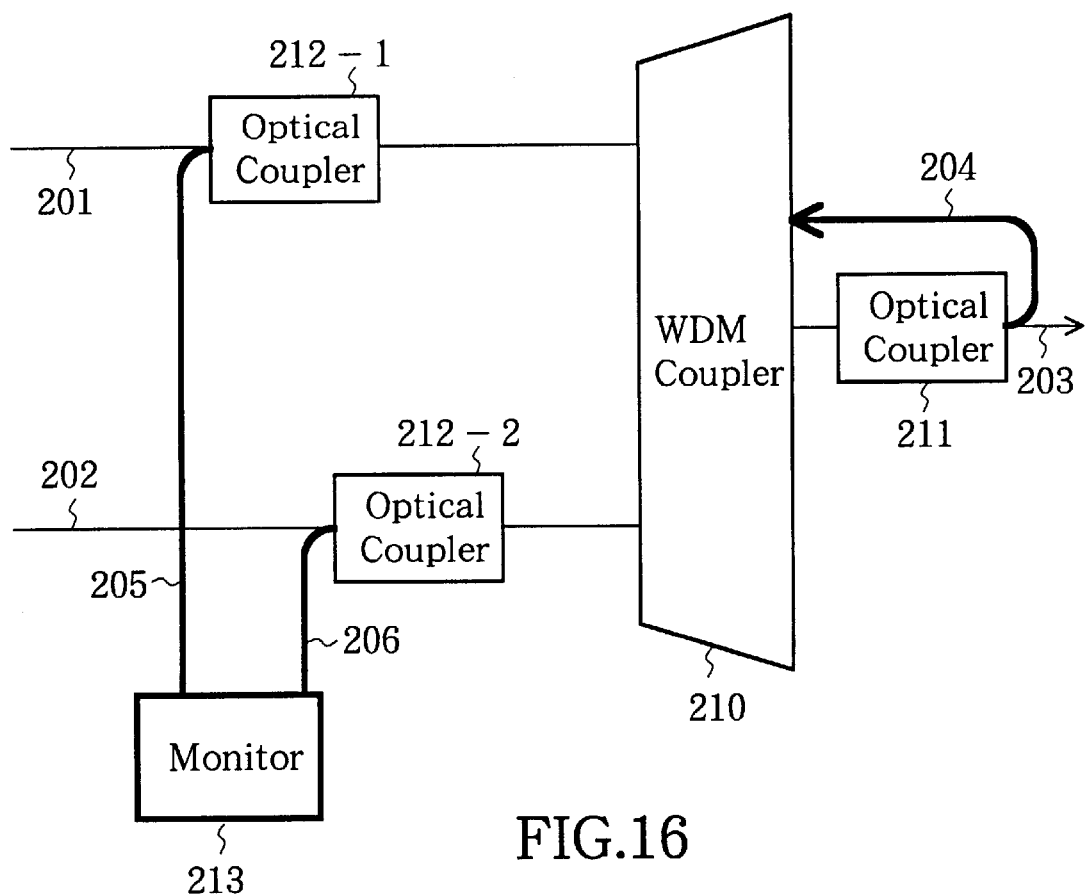
FIG. 16 shows an example of construction for monitoring wavelength multiplexed light.

FIG. 16 shows a basic construction for monitoring the wavelength multiplexed light. In this construction, a signal light having wavelength of, for example, 1550 nm is transmitted through an optical transmission line 201 and a signal light having wavelength of, for example, 1554 nm is transmitted through an optical transmission line 202. These signal lights are wavelength multiplexed by an optical WDM coupler 210 exemplified by the arrayed waveguide diffraction grating and output to an optical transmission line 203. The optical WDM coupler 210 has a function of wavelength-multiplexing signal lights input from a plurality of transmission lines and supplying the wavelength-multiplexed signal to an optical transmission line, a function of wavelength-dividing a wavelength-multiplexed light input from an optical transmission line to lights having respective wavelengths and an optical router function of providing a regular correlation for every wavelength between an optical input port and an optical output port. A portion of the wavelength multiplexed light output to the optical transmission line 203 is optically dropped by the optical coupler 211. The wavelength-multiplexed light is passed through an optical transmission line 204 and input to one of ports of an optical WDM coupler 210, which is on the side of the optical transmission line and adjacent to an optical port thereof from which a light is output to the optical transmission line 203. In this case, due to the router function of the optical WDM coupler 210, a monitor light having wavelength of 1554 nm is output onto the optical transmission line 201 and a monitor light having wavelength of 1550 nm is output onto the optical transmission line 202. These monitor lights are dropped by optical couplers 212-1 and 212-2, respectively, and the dropped monitor lights are input to an optical monitor 213 through respective optical transmission lines 205 and 206. Since these monitor lights are passed through the optical WDM coupler whose pass band is narrow, it becomes possible to perform a monitoring of wavelength deviation and an optical level measurement without influence of spontaneously emitted optical noise component.

Figure 17:
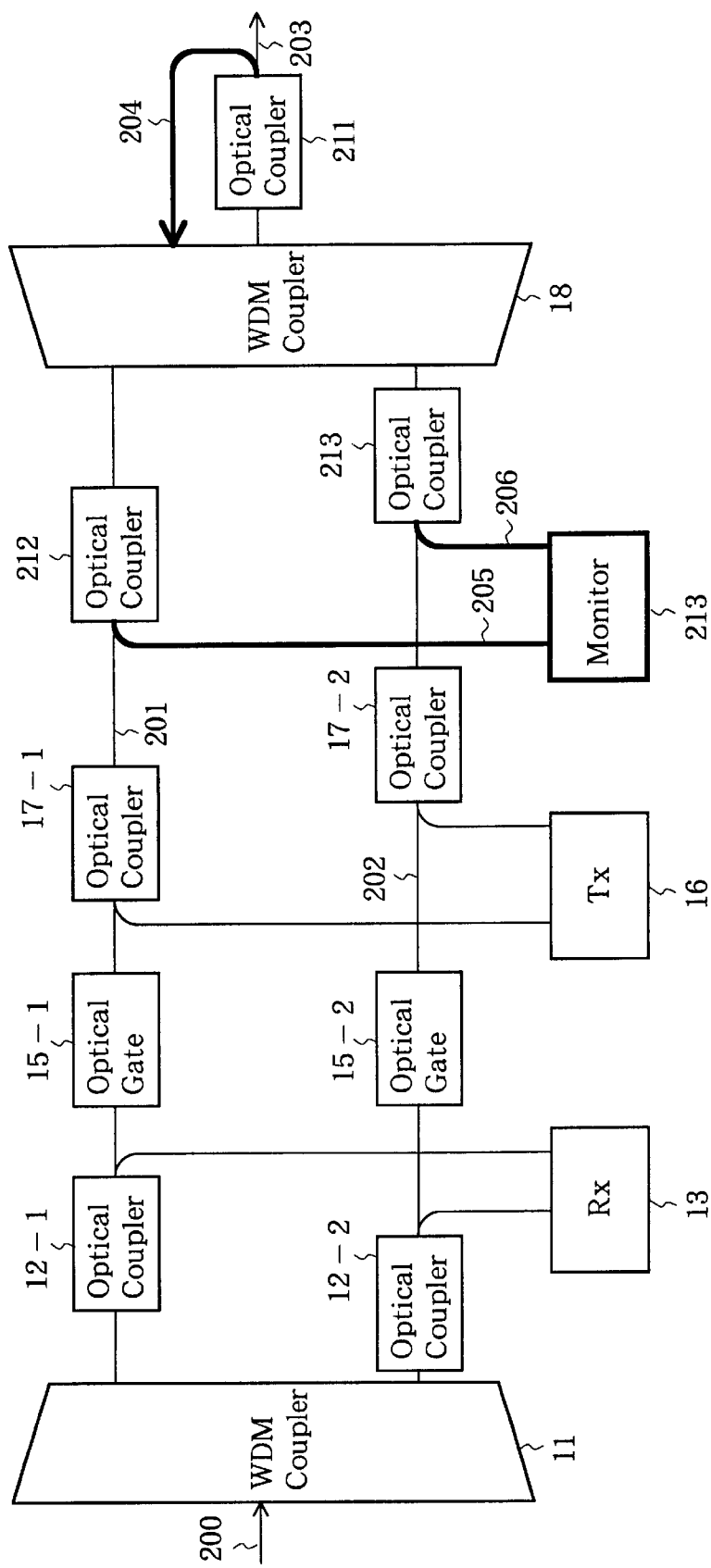
FIG. 17 shows an example of construction for performing the monitor of wavelength-multiplexed light by OADM.

FIG. 17 shows an example in which the wavelength-multiplexed light monitor shown in FIG. 16 is applied to the OADM shown in FIG. 1. In this example, a signal light having wavelength of 1550 nm and a signal light having wavelength of 1554 nm are wavelength-multiplexed and input to an optical wavelength division coupler 11 exemplified by the arrayed waveguide diffraction grating. The signal lights divided by the optical wavelength division coupler 11 are output to optical transmission lines 201 and 202, respectively. That is, the light having one of wavelengths of 1554 nm and 1550 nm is output to the optical transmission line 201 and the light having the other wavelength is output to the optical transmission line 202.

Pass, drop and add of signal light by this OADM will be described by taking the signal light having wavelength of 1550 nm and output to the optical transmission line 201 as an example. For pass, the signal light of 1550 nm is passed through an optical gate 15-1 and input to an optical WDM coupler 18 exemplified by the arrayed waveguide diffraction grating. For drop, a portion of the signal light of 1550 nm is dropped by an optical coupler 12-1 and received by an optical receiver 13. In the following description, it is assumed that a single optical receiver is used for not an individual wavelength but all of wavelengths. For add, an output of signal light is cut off by turning an optical gate switch 15-1 off, and the signal light of wavelength of 1550 nm output from an optical transmitter 16 is guided through an optical coupler 17-1 to the optical transmission line 201 and then to the optical WDM coupler 18. This is the same for the signal light having wavelength of 1554 nm output from the optical wavelength division coupler 11 to the optical transmission line 202.

The wavelength-multiplexed signal light output from the optical WDM coupler 18 is output to the optical transmission line 203 and a portion of the wavelength-multiplexed signal light is dropped by an optical coupler 211 connected to the optical transmission line 203. The dropped light portion is input through an optical transmission line 204 to one of ports of the optical WDM coupler 18, which is on the side of the optical transmission line 203 and adjacent to an optical port thereof from which a light is output to the optical transmission line 203. Due to the router function of the optical WDM coupler 18, a monitor light having wavelength of 1554 nm is output onto the optical transmission line 201 and a monitor light having wavelength of 1550 nm is output onto the optical transmission line 202. These monitor lights are dropped by optical couplers 212-1 and 212-2, respectively, and the dropped monitor lights are input to an optical monitor 213 through respective optical transmission lines 205 and 206. Since these monitor lights are passed through the optical WDM coupler 18 whose pass-band is narrow, it becomes possible to perform a monitoring of wavelength deviation and an optical level measurement without influence of spontaneously emitted optical noise component in the optical monitor 213.

It is possible to specify a location of a fault occurrence by comparing the light having wavelength of 1550 nm and travelling along the optical transmission line 201 with the monitor light having wavelength of 1550 nm which is returned along the optical transmission line 202 by the optical monitor 213. In such case, the optical monitor 213 may be located in an open port of the optical coupler 17-1 or 212-1 for the optical transmission line 201, so that there is no need of newly providing an optical coupler for optical monitor in the optical transmission line, causing the system construction to be simpler.

Figure 18:
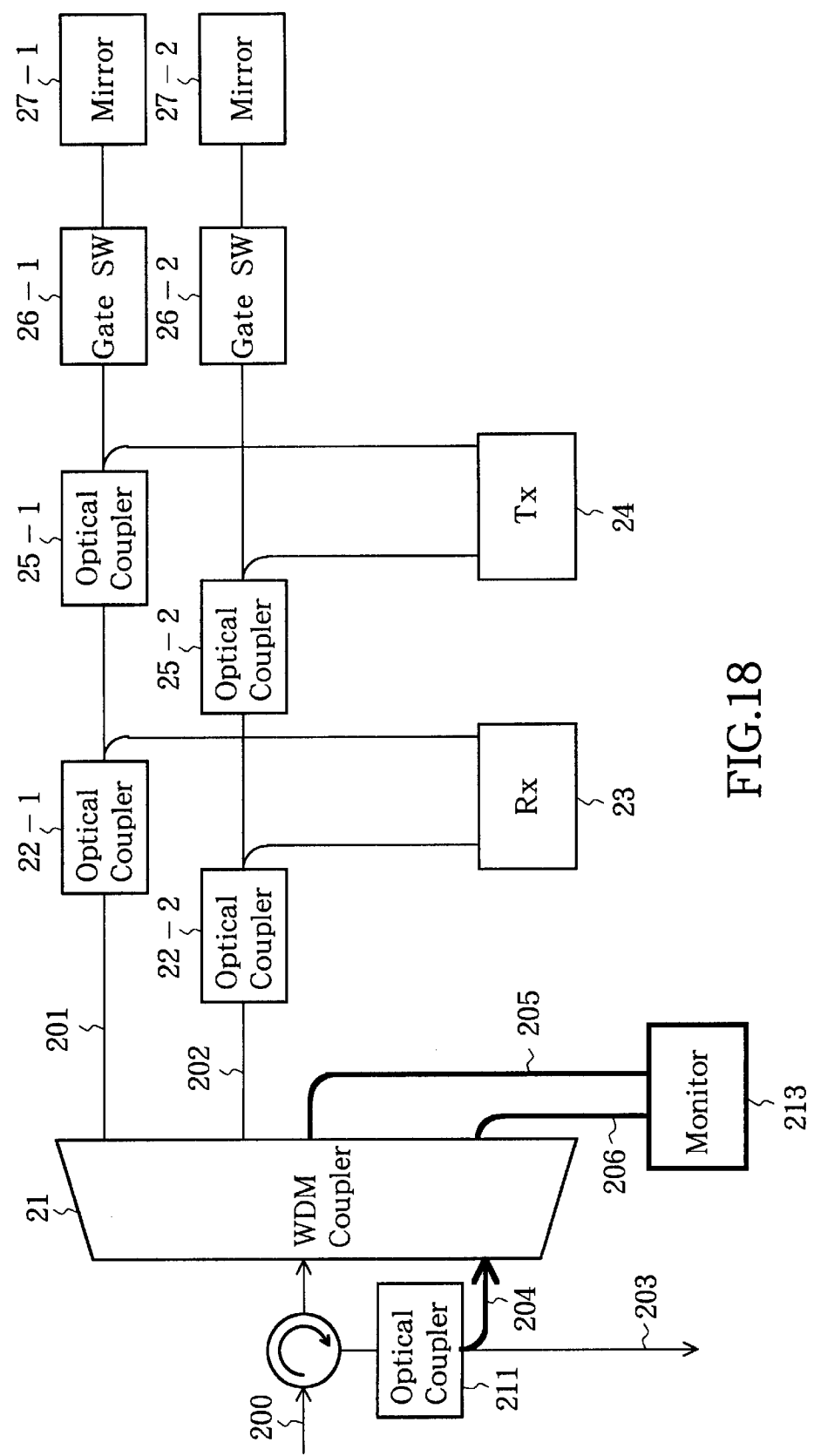
FIG. 18 shows another example of construction for performing the monitor of wavelength-multiplexed light by OADM.

FIG. 18 shows an example in which the wavelength-multiplexed light monitor shown in FIG. 16 is applied to the OADM shown in FIG. 3. In this example, a signal light having wavelength of 1550 nm and a signal light having wavelength of 1554 nm are wavelength-multiplexed on an optical transmission line 200 and input through an optical circulator 28 to an optical WDM coupler 21 exemplified by the arrayed waveguide diffraction grating. The signal lights divided by the optical WDM coupler 21 are output to optical transmission lines 201 and 202, respectively. That is, the light having one of wavelengths 1554 nm and 1550 nm is output to the optical transmission line 201 and the light having the other wavelength is output to the optical transmission line 202.

Describing pass, drop and add of signal light by this OADM, the signal light having wavelength of 1550 nm and output to the optical transmission line 201 is passed through an optical gate 26-1, reflected by a mirror 27-1, passed the optical gate 26-1 again and input to the optical WDM coupler 21 again (pass). A portion of the signal light having wavelength of 1550 nm and output onto the optical coupler 201 is dropped by an optical coupler 12-1 and received by an optical receiver 24 (drop). Further, the signal light of 1550 nm output to the optical transmission line 201 is cut off by turning the optical gate 26-1 off. The signal light having wavelength of 1550 nm output from an optical transmitter 24 is guided by an optical coupler 25-1 to the optical WDM coupler 21 (add). This is the same for the signal light having wavelength of 1554 nm output from the optical wavelength division coupler 11 to the optical transmission line 202.

The wavelength-multiplexed signal light output from the optical WDM coupler 21 is output through an optical circulator 28 to the optical transmission line 203 and a portion of the wavelength-multiplexed signal light is dropped by an optical coupler 211 inserted into the optical transmission line 203. The dropped light portion is input through an optical transmission line 204 to one of ports of the optical WDM coupler 21, which is different from an optical input/output port connected to an optical transmission line 200. Due to the router function of the optical WDM coupler 21, a monitor light having wavelength of 1554 nm is output onto an optical transmission line 205 and a monitor light having wavelength of 1550 nm is output onto an optical transmission line 206. Since these monitor lights are passed through the optical WAM coupler 21 whose pass-band is narrow, it becomes possible to perform a monitoring of wavelength deviation and an optical level measurement without influence of spontaneously emitted optical noise component.

Figure 19:
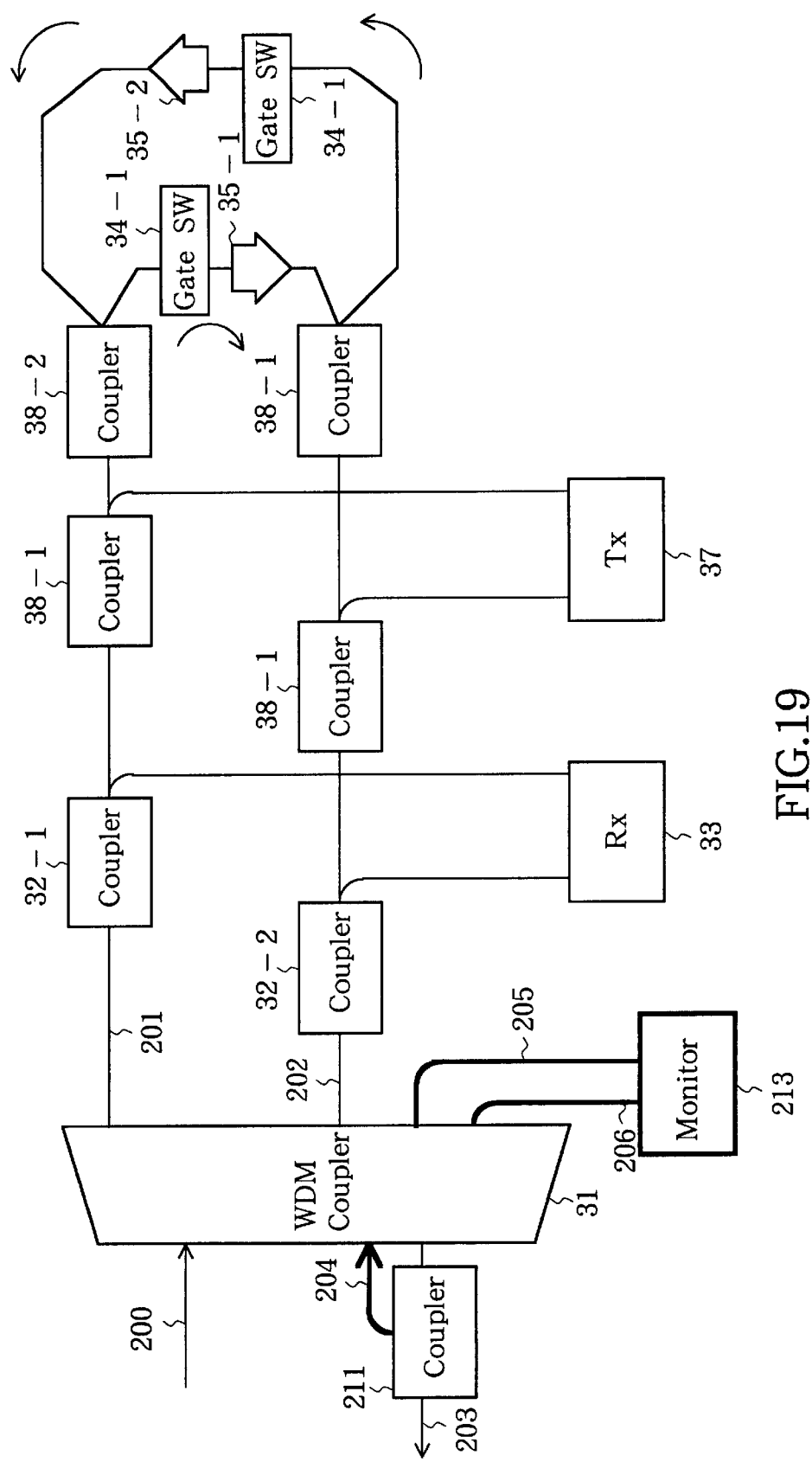
FIG. 19 shows a further example of construction for performing the monitor of wavelength-multiplexed light by OADM.

FIG. 19 shows an example in which the wavelength-multiplexed light monitor shown in FIG. 16 is applied to the OADM shown in FIG. 4. In this example, a signal light having wavelength of 1550 nm and a signal light having wavelength of 1554 nm are wavelength-multiplexed on an optical transmission line 200 and input to an optical wavelength division coupler 31 exemplified by the arrayed waveguide diffraction grating. The signal lights divided by the optical wavelength division coupler 31 are output to optical transmission lines 201 and 202, respectively. That is, the light having one of wavelengths of 1554 nm and 1550 nm is output to the optical transmission line 201 and the light having the other wavelength is output to the optical transmission line 202.

Pass, drop and add of signal light by this OADM will be described for the signal light having wavelength of 1550 nm and output to the optical transmission line 201. This signal light is input through optical couplers 32-1, 38-2 and 36-2 to an optical gate 34-1. The signal light passed through the optical gate 34-1 is input through an optical isolator 35-1, an optical coupler 36-1 having 1:1 dropping ratio and the optical transmission line 202 to an optical WDM coupler 31 (pass). A portion of the signal light having wavelength of 1550 nm and output onto the optical coupler 201 is dropped by the optical coupler 32-1 and received by an optical receiver 33 (drop). Further, the signal light of 1550 nm output to the optical transmission line 201 is cut off by turning the optical gate 34-1 off. The signal light having wavelength of 1550 nm output from an optical transmitter 37 is guided by an optical coupler 38-1 to the optical transmission line 202 and input to the WDM coupler 31 (add). This is the same for the signal light having wavelength of 1554 nm output from the optical wavelength division coupler 31 to the optical transmission line 202.

The wavelength-multiplexed signal light output from the optical WDM coupler 31 is output to the optical transmission line 203 and a portion thereof is dropped by an optical coupler 211 connected to the same transmission line. The dropped wavelength-multiplexed light is input through an optical transmission line 204 to one of ports of the optical WDM coupler 31, which is different from an optical output port connected to the optical transmission line 203. Due to the router function of the optical WDM coupler 31, a monitor light having wavelength of 1554 nm is output onto an optical transmission line 205 and a monitor light having wavelength of 1550 nm is output onto an optical transmission line 206, and these monitor lights are input to an optical monitor 213. Since the monitor light is passed through the optical WDM coupler 31 whose pass band is narrow, the optical monitor 213 can perform a monitoring of wavelength deviation and an optical level measurement without influence of spontaneously emitted optical noise component.

Figure 20:
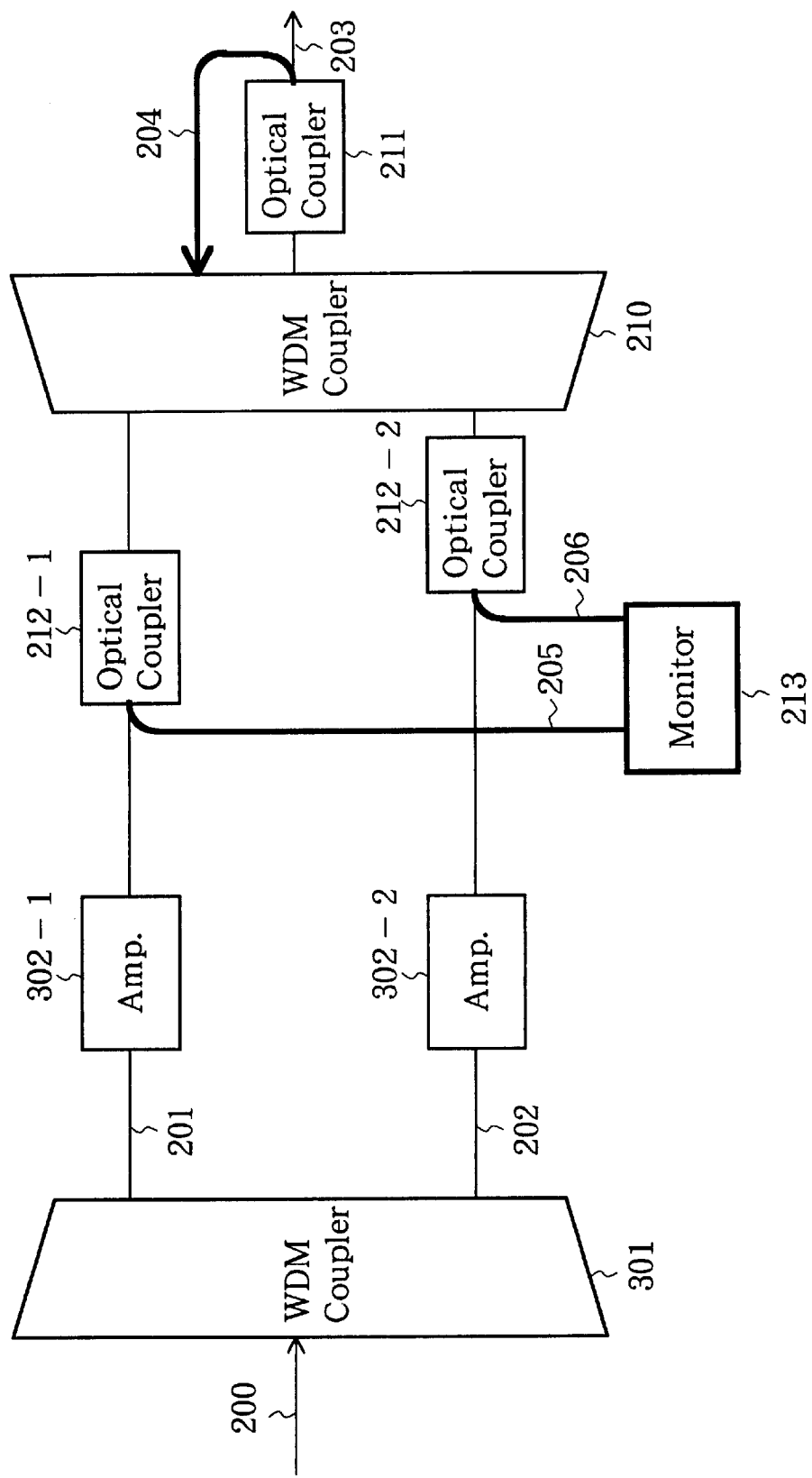
FIG. 20 shows an example of construction for performing the monitor of wavelength-multiplexed light by a wavelength-multiplexed light repeater/amplifier.

FIG. 20 shows an example in which the wavelength-multiplexed light monitor is applied to a wavelength-multiplexed light repeater/amplifier. In this example, a signal light having wavelength of 1550 nm and a signal light having wavelength of 1554 nm are wavelength-multiplexed on an optical transmission line 200 and input to an optical wavelength division coupler 301 exemplified by the arrayed waveguide diffraction grating. The signal lights divided by the optical wavelength division coupler 301 are output to optical transmission lines 201 and 202, respectively. That is, the light having one of wavelengths of 1554 nm and 1550 nm is output to the optical transmission line 201 and the light having the other wavelength is output to the optical transmission line 202.

The signal light having wavelength of 1550 nm amplified by an optical amplifier 302-1 provided in the optical transmission line 201 is input to an optical WDM coupler 210 exemplified by the arrayed waveguide diffraction grating and, similarly, the signal light having wavelength of 1554 nm is amplified by an optical amplifier 302-2 provided in the optical transmission line 202 and input to the optical WDM coupler 210.

The signal light wavelength-multiplexed by the optical WDM coupler 210 is output to the optical transmission line 203 and a portion thereof is dropped by an optical coupler 211 provided in the optical transmission line 203. The wavelength-multiplexed light thus dropped is passed through an optical transmission line 204 and input to one of ports of the optical WDM coupler 210, which is adjacent to an optical port connected to the optical transmission line 203. Due to the router function of the optical WDM coupler 210, a monitor light having wavelength of 1554 nm is output onto an optical transmission line 201 and a monitor light having wavelength of 1550 nm is output onto an optical transmission line 202, and these monitor lights are dropped by optical couplers 212-1 and 211-2, passed through the optical transmission lines 205 and 206 and input to an optical monitor 213, respectively. Since the monitor light is passed through the optical WDM coupler 210 whose pass band is narrow, the optical monitor 213 can perform a monitoring of wavelength deviation and an optical level measurement without influence of spontaneously emitted optical noise component.

Figure 21:
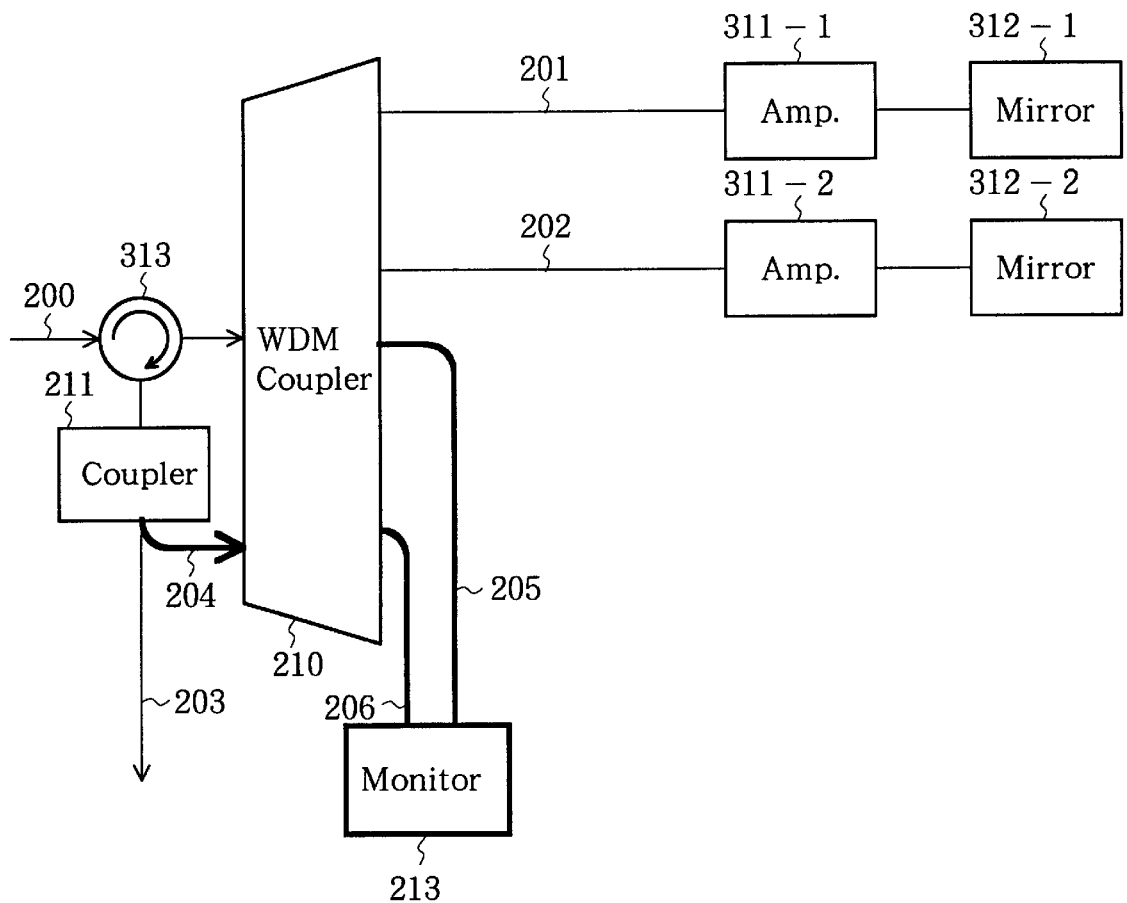
FIG. 21 shows another example of construction for performing the monitor of wavelength-multiplexed light by a wavelength-multiplexed light repeater/amplifier.

FIG. 21 shows another example in which the wavelength-multiplexed light monitor is applied to a wavelength-multiplexed light repeater/amplifier. In this example, a signal light having wavelength of 1550 nm and a signal light having wavelength of 1554 nm are wavelength-multiplexed on an optical transmission line 110 and input through an optical circulator 313 to an optical wavelength division coupler 210 exemplified by the arrayed waveguide diffraction grating. The signal lights divided by the optical wavelength division coupler 210 are output to optical transmission lines 201 and 202, respectively. That is, the light having one of wavelengths of 1554 nm and 1550 nm is output to the optical transmission line 201 and the light having the other wavelength is output to the optical transmission line 202.

The signal light on the optical transmission line 201 which has wavelength of 1550 nm is amplified by an optical amplifier 311-1, reflected by a mirror 312-1, amplified by the optical amplifier 311-1 again and input again to the optical WDM coupler 210 and, similarly, the signal light having wavelength of 1554 nm is amplified and repeated by an optical amplifier 311-2 and a mirror 312-2 and input to the optical WDM coupler 210.

The signal light wavelength-multiplexed by the optical WDM coupler 210 is output through the optical circulator 313 to the optical transmission line 203 and a portion thereof is dropped by an optical coupler 211 provided in the optical transmission line 203. The wavelength-multiplexed light thus dropped is passed through an optical transmission line 204 and input to one of ports of the optical WDM coupler 210, which is different from an optical port connected to an optical transmission line 200. Due to the router function of the optical WDM coupler 210, a monitor light having wavelength of 1554 nm is output onto an optical transmission line 205 and a monitor light having wavelength of 1550 nm is output onto an optical transmission line 206, and these monitor lights are input to an optical monitor 213, respectively. Since the monitor light is passed through the optical WDM coupler 210 whose pass-band is narrow, it becomes possible to perform a monitoring of wavelength deviation and an optical level measurement without influence of spontaneously emitted optical noise component.

Figure 22:
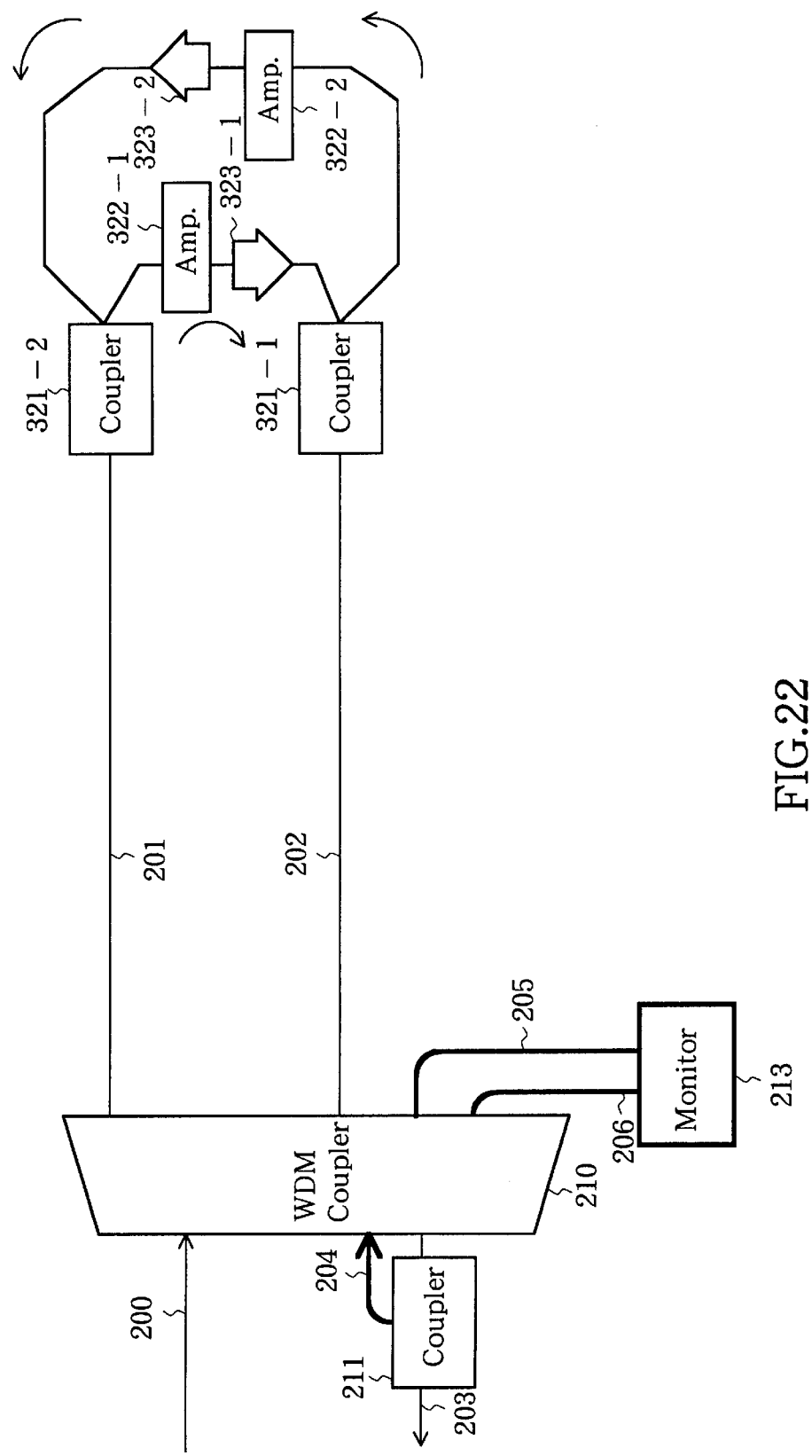
FIG. 22 shows another example of construction for performing the monitor of wavelength-multiplexed light by the wavelength-multiplexed light repeater/amplifier.

FIG. 22 shows another example in which the wavelength-multiplexed light monitor is applied to a wavelength-multiplexed light repeater/amplifier. In this example, a signal light having wavelength of 1550 nm and a signal light having wavelength of 1554 nm are wavelength-multiplexed on an optical transmission line 200 and input to an optical wavelength division coupler 210 exemplified by the arrayed waveguide diffraction grating. The signal lights divided by the optical wavelength division coupler 210 are output to optical transmission lines 201 and 202, respectively. That is, the light having one of wavelengths of 1554 nm and 1550 nm is output to the optical transmission line 201 and the light having the other wavelength is output to the optical transmission line 202.

The signal light on the optical transmission line 201 which has wavelength of 1550 nm is input through an optical coupler 321-1 to an optical amplifier 322-1 and, after amplified thereby, guided through an optical isolator 323-1 and an optical coupler 321-1 having 1:1 dropping ratio to the optical transmission line 202 and input to the optical WDM coupler 210. On the other hand, the signal light having wavelength of 1554 nm is input through an optical coupler 321-1 to an optical amplifier 322-2 and, after amplified, guided through an optical isolator 323-2 and an optical coupler 321-2 having 1:1 dropping ratio to the optical transmission line 201 and input to the optical WDM coupler 210.

The signal light wavelength-multiplexed by the optical WDM coupler 210 is output to the optical transmission line 203 and a portion thereof is dropped by an optical coupler 211 provided in the optical transmission line 203. The wavelength-multiplexed light thus dropped is passed through an optical transmission line 204 and input to one of ports of the optical WDM coupler 210, which is different from an optical port connected to an optical transmission line 203. Due to the router function of the optical WDM coupler 210, a monitor light having wavelength of 1554 nm is output onto an optical transmission line 205 and a monitor light having wavelength of 1550 nm is output onto an optical transmission line 206, and these monitor lights are input to an optical monitor 213, respectively. Since the monitor light is passed through the optical WDM coupler 210 whose pass-band is narrow, it becomes possible to perform a monitoring of wavelength deviation and an optical level measurement without influence of spontaneously emitted optical noise component.

Figure 23:
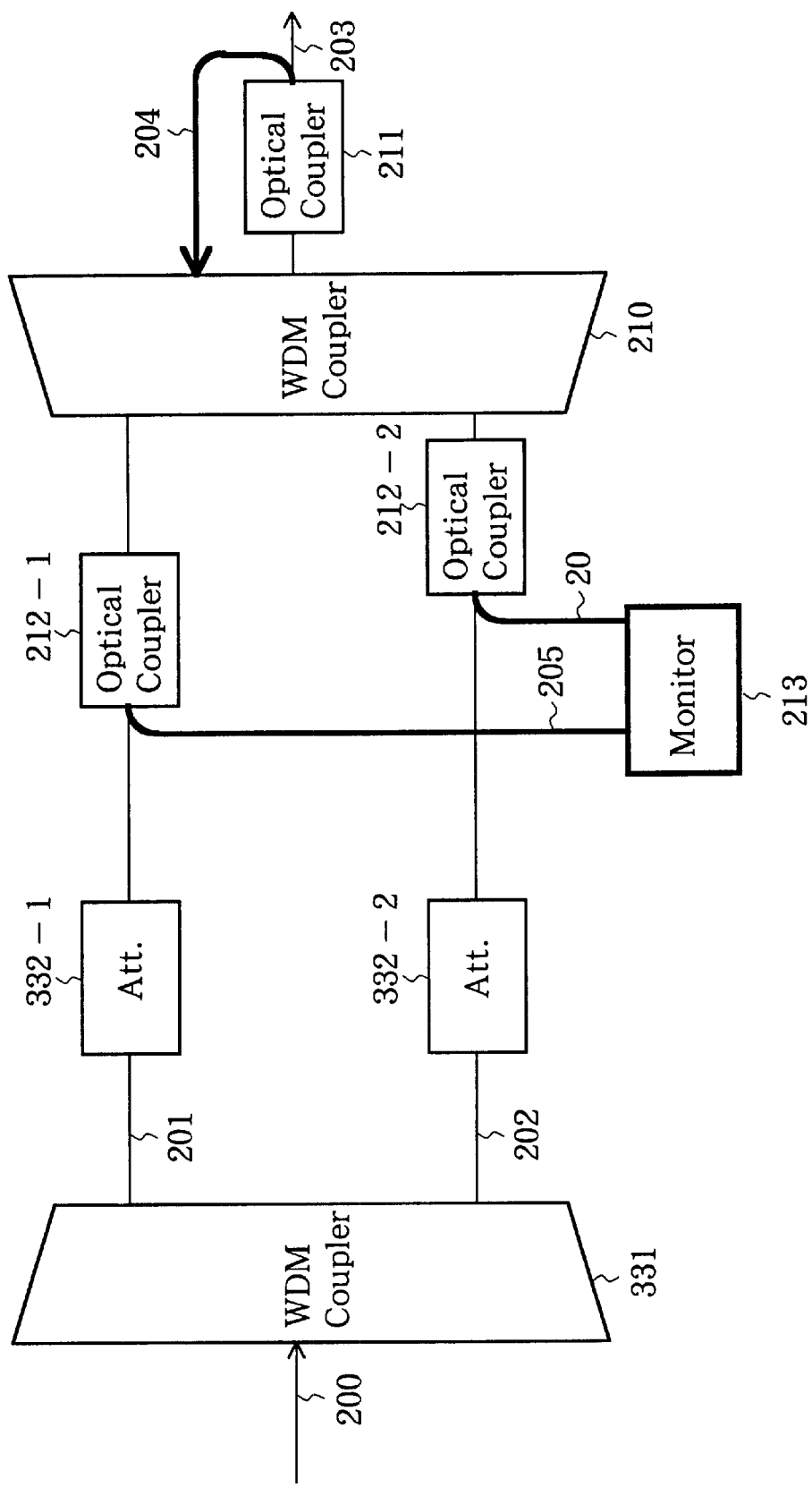
FIG. 23 shows an example of construction for performing the monitor of wavelength-multiplexed light by a wavelength-multiplexed light gain equalizer.

FIG. 23 shows an example in which the wavelength-multiplexed light monitor is applied to a wavelength-multiplexed light gain equalizer. In this example, a signal light having wavelength of 1550 nm and a signal light having wavelength of 1554 nm are wavelength-multiplexed on an optical transmission line 200 and input to an optical wavelength divider 331 exemplified by the arrayed waveguide diffraction grating. The signal lights divided by the optical wavelength division coupler 210 are output to optical transmission lines 201 and 202, respectively. That is, the light having one of wavelengths of 1554 nm and 1550 nm is output to the optical transmission line 201 and the light having the other wavelength is output to the optical transmission line 202.

The signal light on the optical transmission line 201 which has wavelength of 1550 nm is optically attenuated by an optical attenuator 332-1 and input to an optical WDM coupler 210. On the other hand, the signal light having wavelength of 1554 nm is optically attenuated by an optical attenuator 332-2 and input to the optical WDM coupler 210.

The signal light wavelength-multiplexed by the optical WDM coupler 210 is output to the optical transmission line 203 and a portion thereof is dropped by an optical coupler 211 provided in the optical transmission line 203. The wavelength-multiplexed light thus dropped is passed through an optical transmission line 204 and input to one of ports of the optical WDM coupler 210, which is adjacent to an optical port connected to an optical transmission line 203. Due to the router function of the optical WDM coupler 210, a monitor light having wavelength of 1554 nm is output onto an optical transmission line 201 and a monitor light having wavelength of 1550 nm is output onto an optical transmission line 202, and these monitor lights are dropped by optical couplers 212-1 and 212-2, passed through optical transmission lines 205 and 206 and input to an optical monitor 213, respectively. Since the monitor light is passed through the optical WDM coupler 210 whose pass band is narrow, it becomes possible to perform a monitoring of wavelength deviation and an optical level measurement without influence of spontaneously emitted optical noise component.

Figure 24:
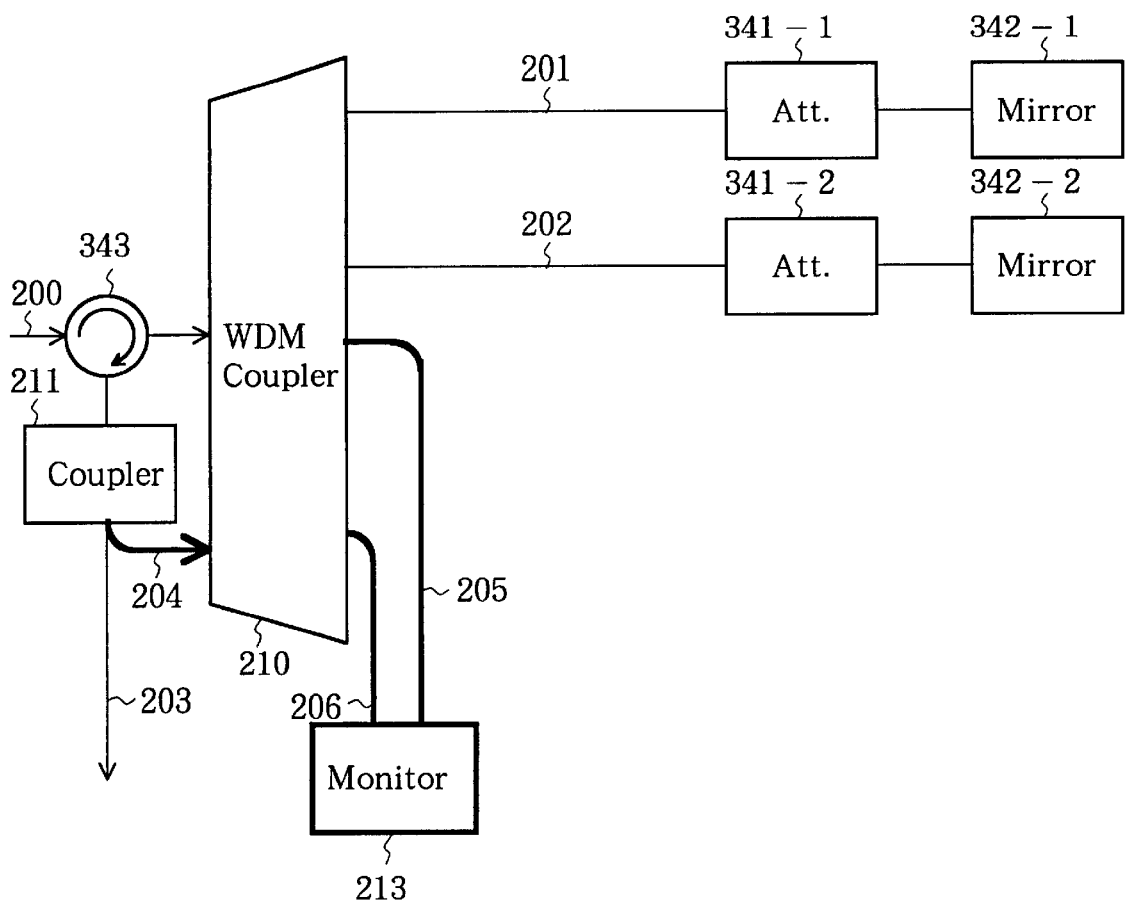
FIG. 24 shows another example of construction for performing the monitor of wavelength-multiplexed light by a wavelength-multiplexed light gain equalizer.

FIG. 24 shows another example in which the wavelength-multiplexed light monitor is applied to a wavelength-multiplexed light gain equalizer. In this example, a signal light having wavelength of 1550 nm and a signal light having wavelength of 1554 nm are wavelength-multiplexed on an optical transmission line 200 and input through an optical circulator 343 to an optical wavelength division coupler 210 exemplified by the arrayed waveguide diffraction grating. The signal lights divided by the optical wavelength division coupler 210 are output to optical transmission lines 201 and 202, respectively. That is, the 111 light having one of wavelengths of 1554 nm and 1550 nm is output to the optical transmission line 201 and the light having the other wavelength is output to the optical transmission line 202, The signal light on the optical transmission line 201 which has wavelength of 1550 nm and is optically attenuated by an optical attenuator 341-1 provided in the optical transmission line 201 is reflected by a mirror 342-1, optically attenuated by the optical attenuator 341-1 again and input to the optical WDM coupler 210 again. Similarly, the signal light having wavelength of 1554 nm on the optical transmission line 202 is optically attenuated by an optical attenuator 341-2, reflected by a mirror 342-2 and input to the optical WDM coupler 210.

The signal light wavelength-multiplexed by the optical WDM coupler 210 is output through the optical circulator 343 to the optical transmission line 203 and a portion thereof is dropped by an optical coupler 211 provided in the optical transmission line 203. The wavelength-multiplexed light thus dropped is passed through an optical transmission line 204 and input to one of ports of the optical WDM coupler 210, which is different from an optical port connected to an optical transmission line 200. Due to the router function of the optical WDM coupler 210, a monitor light having wavelength of 1554 nm is output onto an optical transmission line 205 and a monitor light having wavelength of 1550 nm is output onto an optical transmission line 206, and these monitor lights are input to an optical monitor 213, respectively. Since the monitor light is passed through the optical WDM coupler 210 whose pass-band is narrow, it becomes possible to perform a monitoring of wavelength deviation and an optical level measurement without influence of spontaneously emitted optical noise component.

Figure 25:
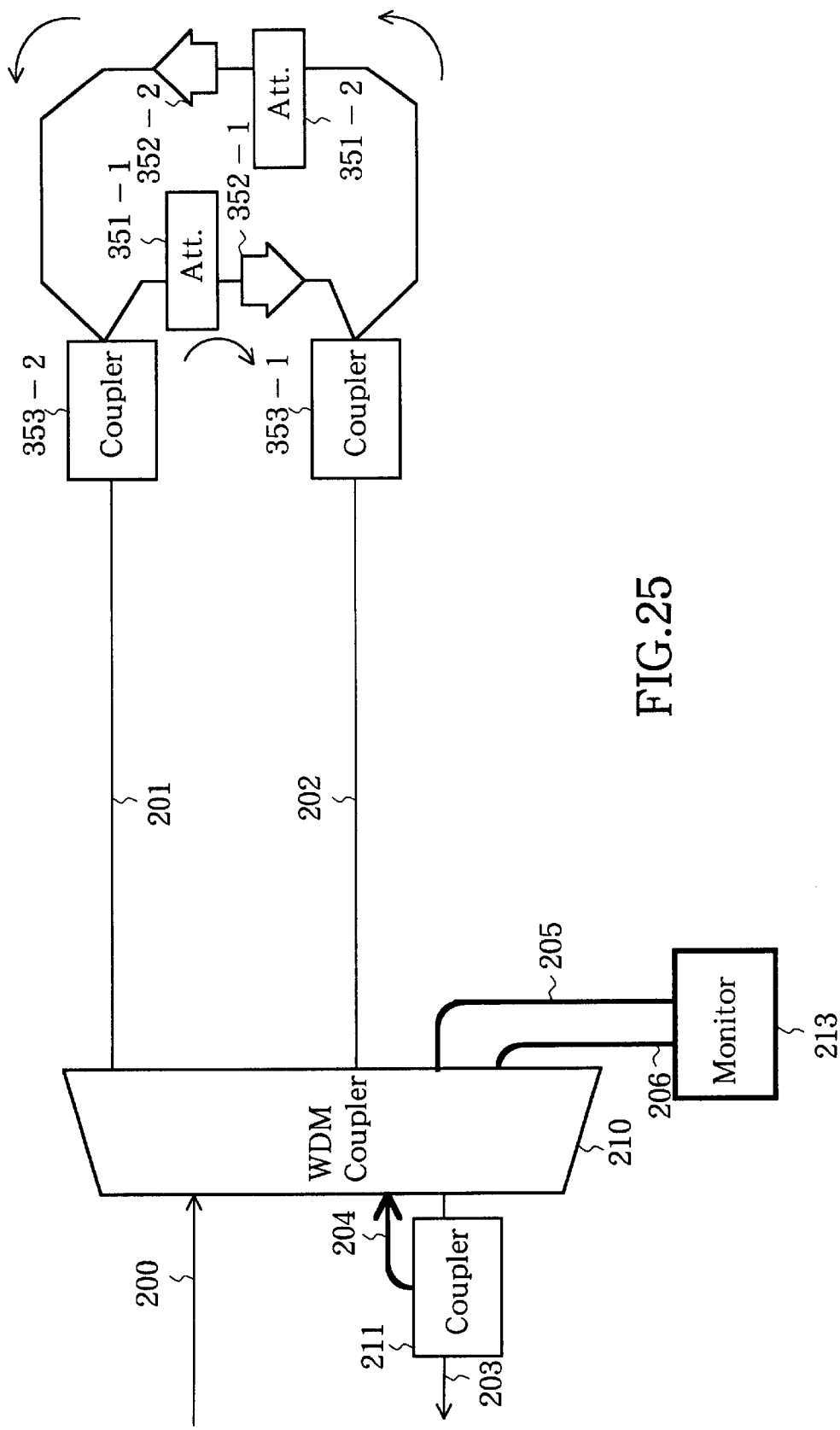
FIG. 25 shows another example of construction for performing the monitor of wavelength-multiplexed light by a wavelength-multiplexed light gain equalizer.

FIG. 25 shows another example in which the wavelength-multiplexed light monitor is applied to a wavelength-multiplexed light gain equalizer. In this example, a signal light having wavelength of 1550 nm and a signal light having wavelength of 1554 nm are wavelength-multiplexed on an optical transmission line 200 by an optical WDM coupler 210 and output to different optical transmission lines 201 and 202, respectively. That is, the light having one of wavelengths of 1554 nm and 1550 nm is output to the optical transmission line 201 and the light having the other wavelength is output to the optical transmission line 202.

The signal light on the optical transmission line 201 which has wavelength of 1550 nm is input to an optical attenuator 351-1 and, after optically attenuated thereby, guided through an optical isolator 352-1 and an optical coupler 353-2 having 1:1 dropping ratio to the optical transmission line 202 and input to the optical WDM coupler 210. Similarly, the signal light having wavelength of 1554 nm on the optical transmission line 202 is supplied through the optical coupler 353-1 to an optical attenuator 341-2, guided after optically attenuated thereby through an optical isolator 352-2 and an optical coupler 353-2 having 1:1 dropping ratio to the optical transmission line 201 and input to the optical WDM coupler 210.

The signal light wavelength-multiplexed by the optical WDM coupler 210 is output to the optical transmission line 203 and a portion thereof is dropped by an optical coupler 211 provided in the optical transmission line 203. The wavelength-multiplexed light thus dropped is passed through an optical transmission line 204 and input to one of ports of the optical WDM coupler 210, which is different from an optical port connected to an optical transmission line 203. Due to the router function of the optical WDM coupler 210, a monitor light having wavelength of 1554 nm is output onto an optical transmission line 205 and a monitor light having wavelength of 1550 nm is output onto an optical transmission line 206, respectively, and these monitor lights are input to an optical monitor 213. Since the monitor light is passed through the optical WDM coupler 210 whose pass-band is narrow, it becomes possible to perform a monitoring of wavelength deviation and an optical level measurement without influence of spontaneously emitted optical noise component.

Figure 26:
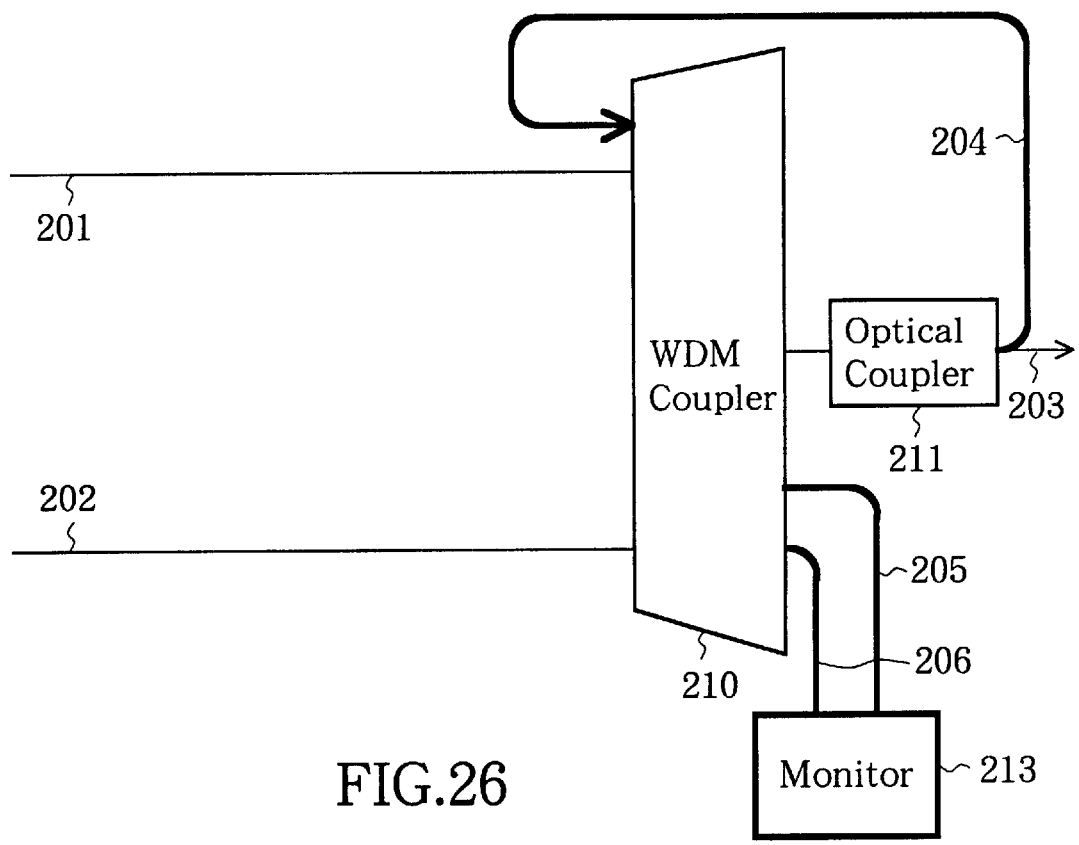
FIG. 26 shows another construction for monitoring wavelength multiplexed light.
Figure 27:
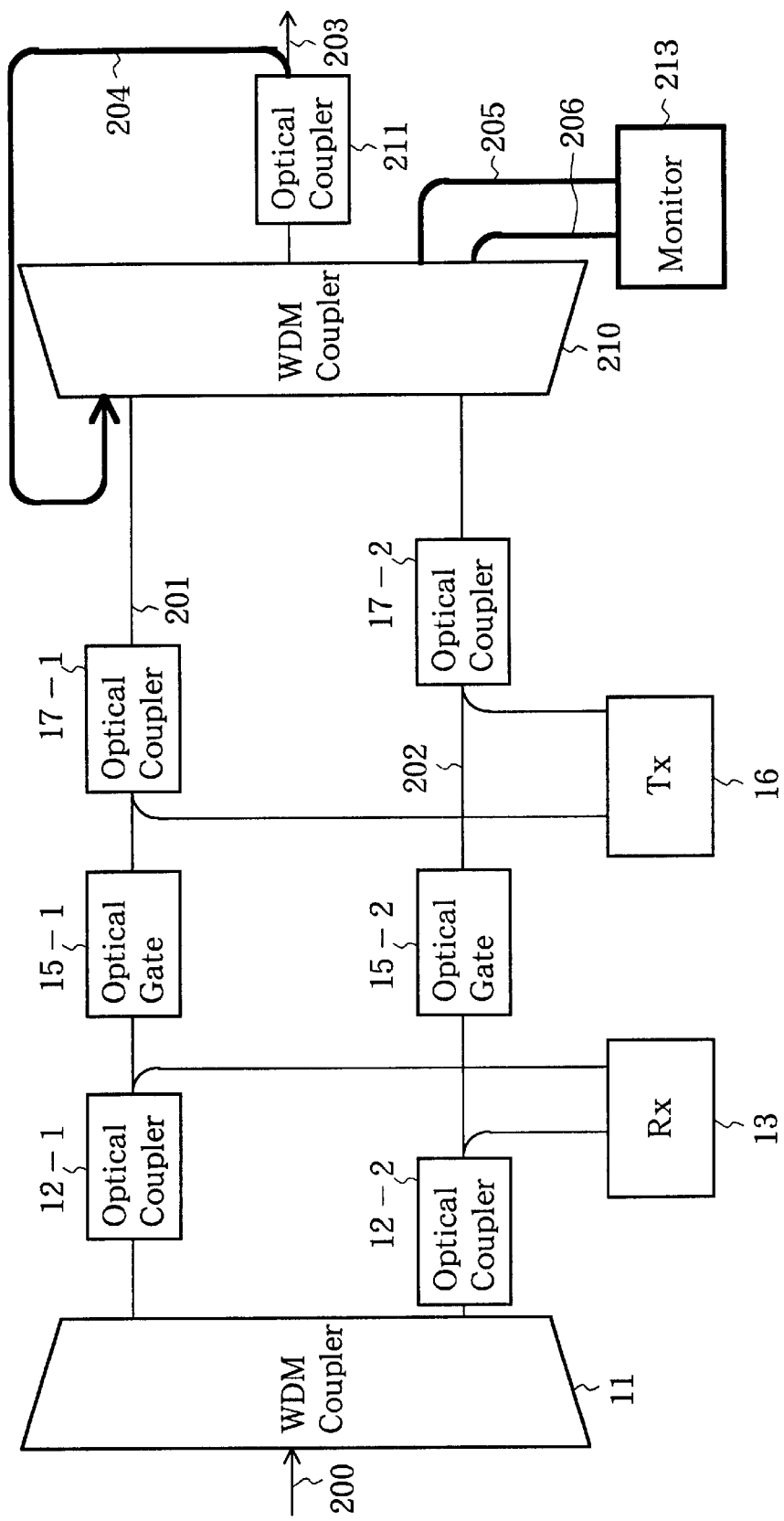
FIG. 27 shows an example for realizing the construction shown in FIG. 26 by OADM.
Figure 28:
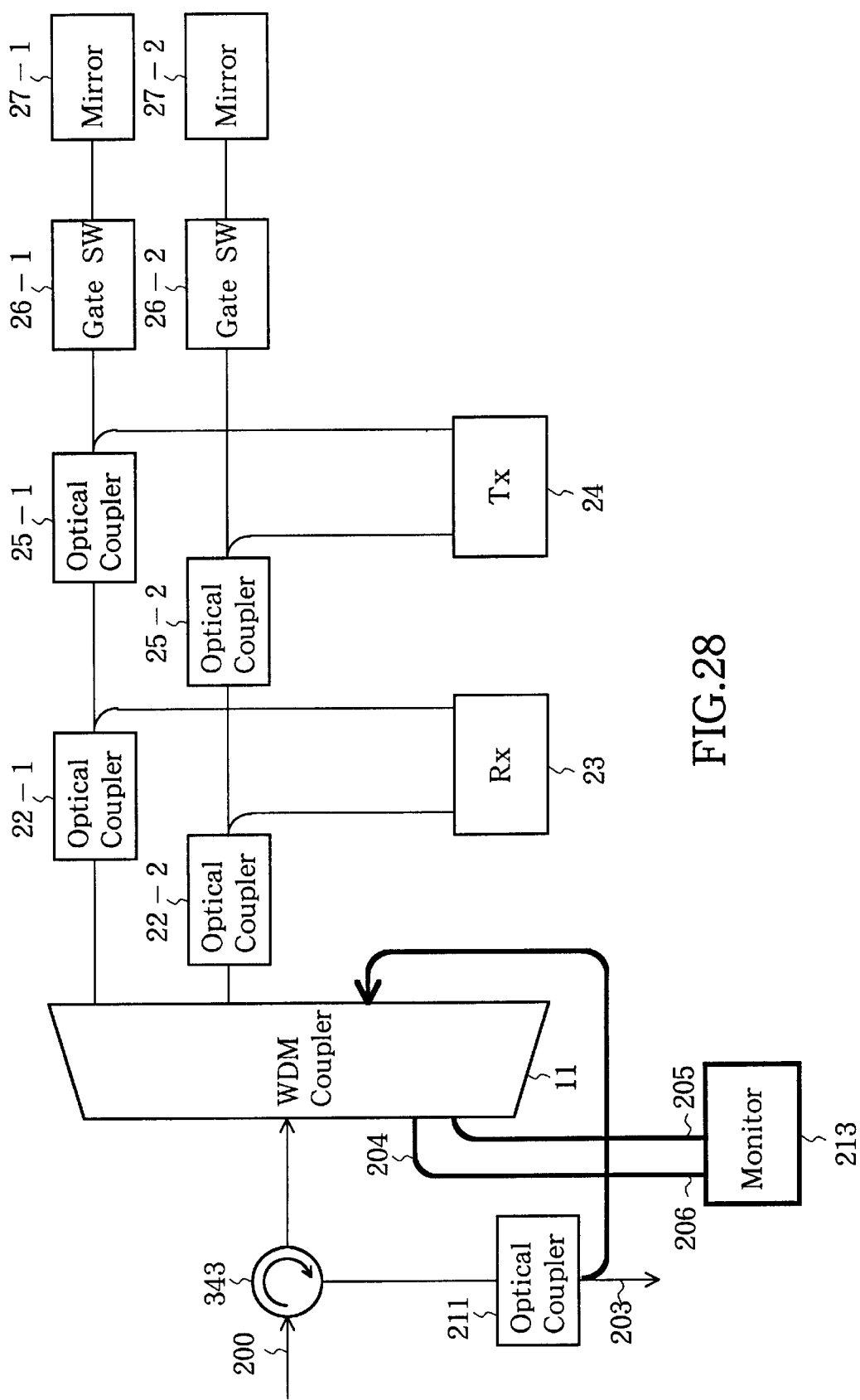
FIG. 28 shows another example for realizing the construction shown in FIG. 26 by OADM.
Figure 29:
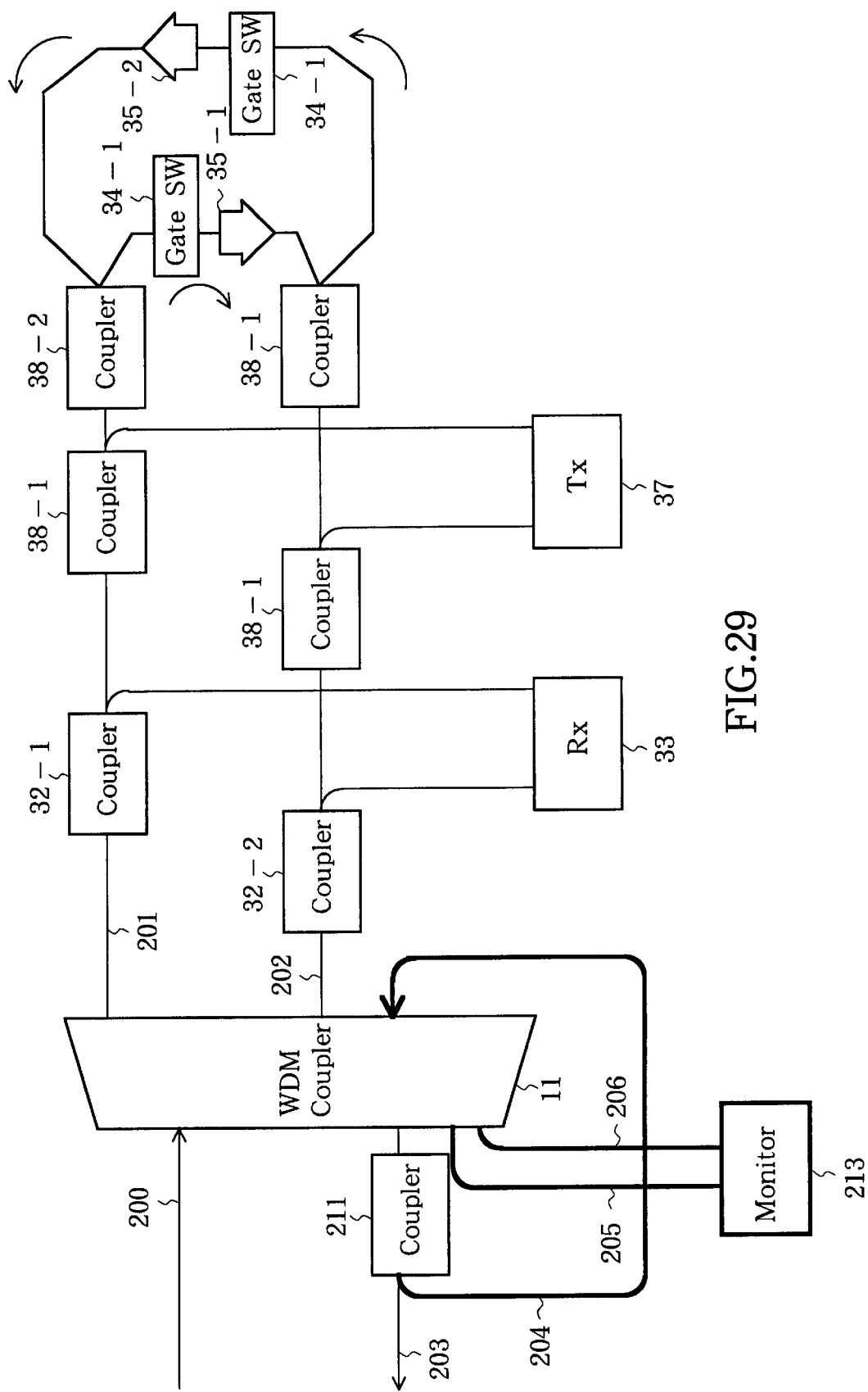
FIG. 29 shows a further example for realizing the construction shown in FIG. 26 by OADM.
Figure 30:
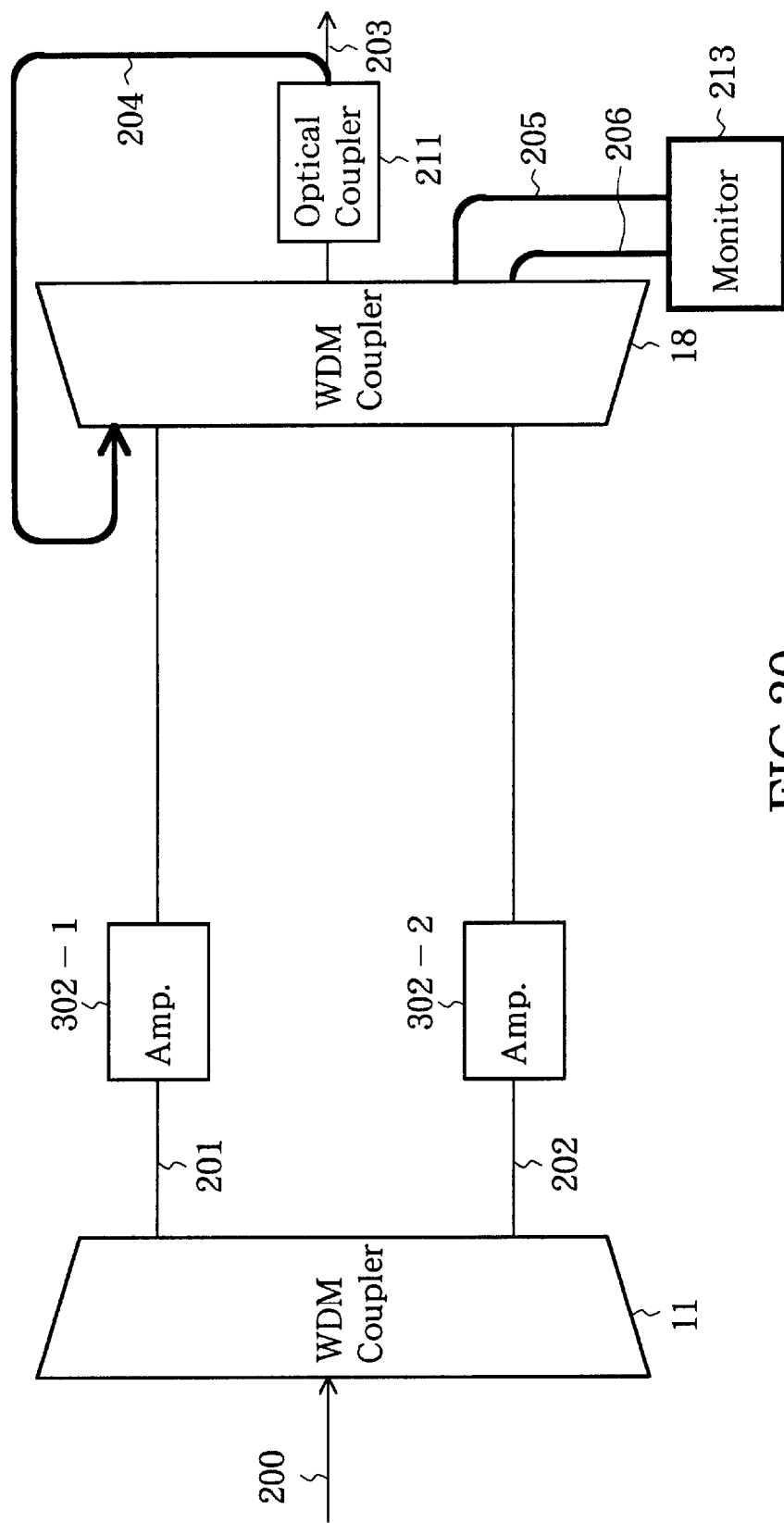
FIG. 30 shows an example of construction for realizing the construction shown in FIG. 26 by a wavelength-multiplexed light repeater/amplifier.
Figure 31:
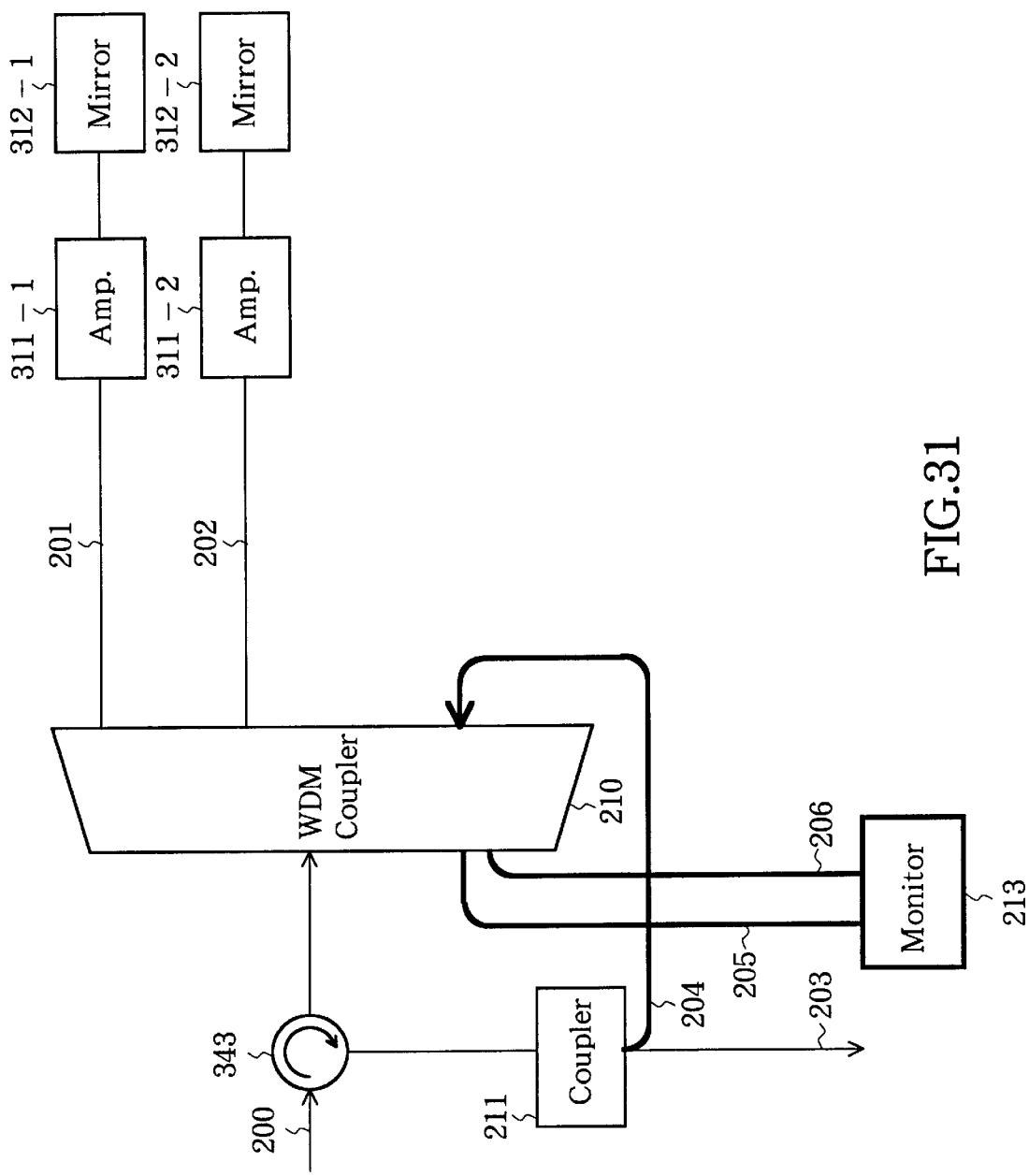
FIG. 31 shows another example of construction for realizing the construction shown in FIG. 26 by a wavelength-multiplexed light repeater/amplifier.
Figure 32:
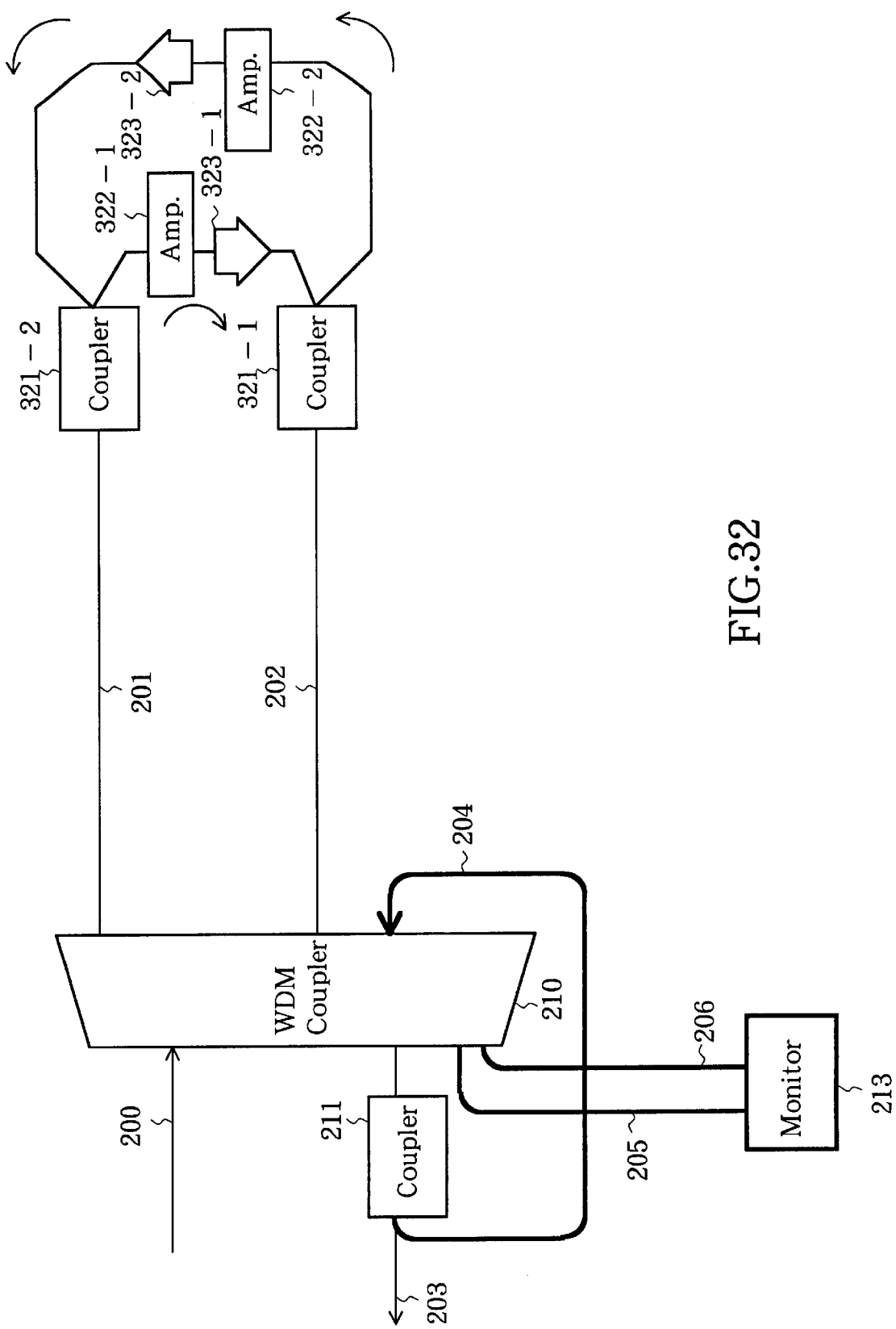
FIG. 32 shows another example of construction for realizing the construction shown in FIG. 26 by a wavelength-multiplexed light repeater/amplifier.
Figure 33:
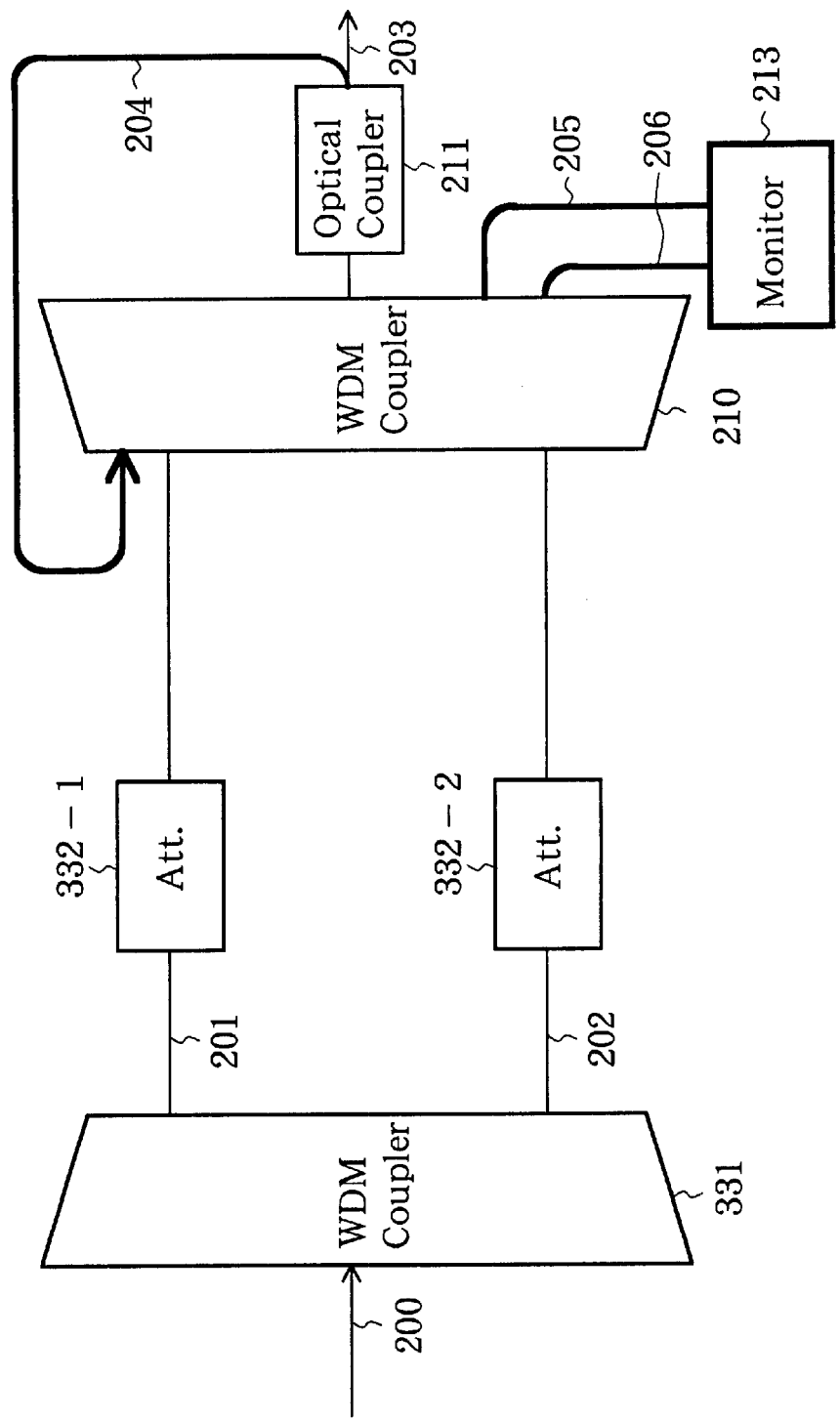
FIG. 33 shows an example of construction for realizing the construction shown in FIG. 26 by a wavelength-multiplexed light g a in equalizer.
Figure 34:
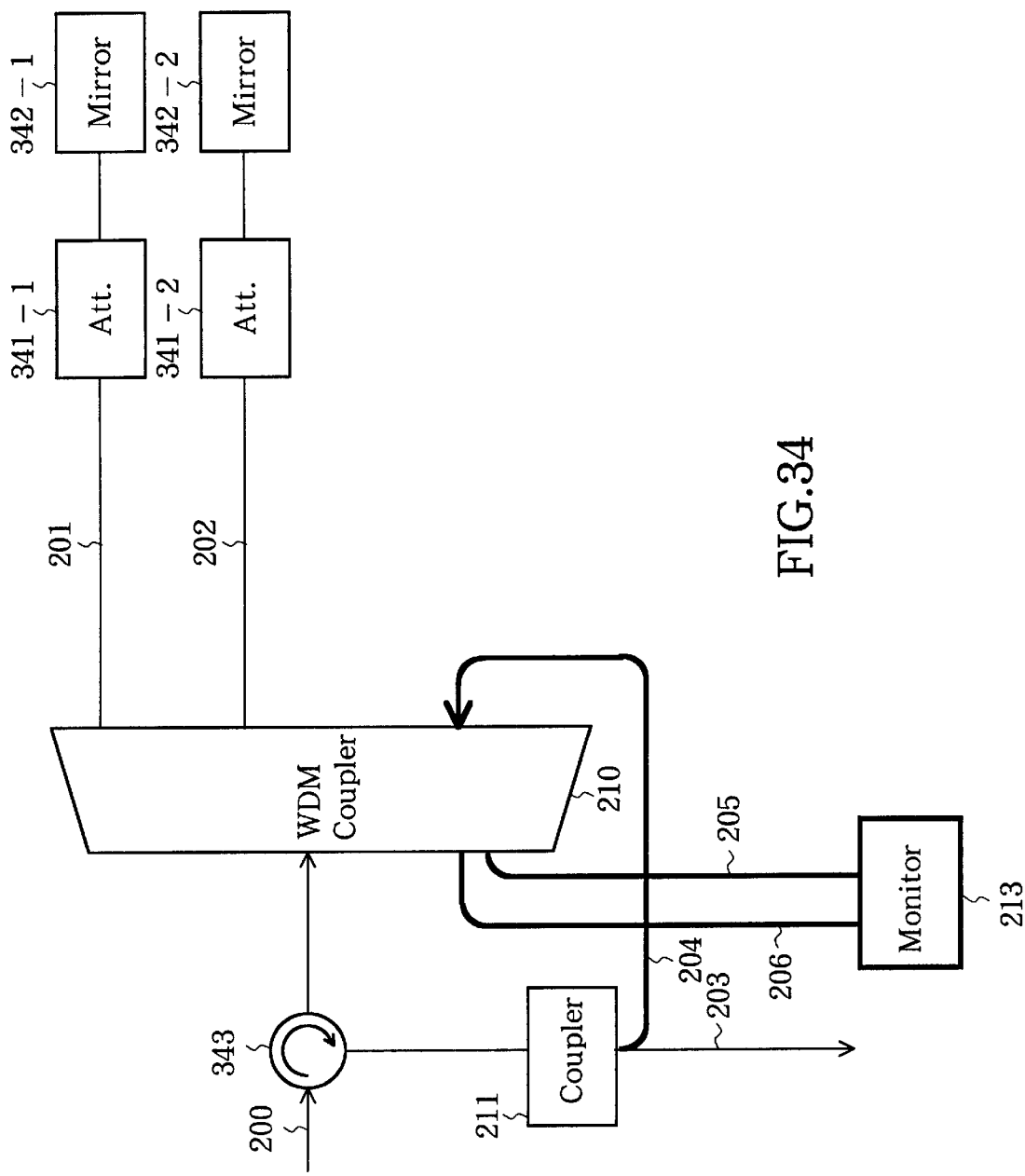
FIG. 34 shows another example of construction for realizing the construction shown in FIG. 26 by a wavelength-multiplexed light gain equalizer.
Figure 35:
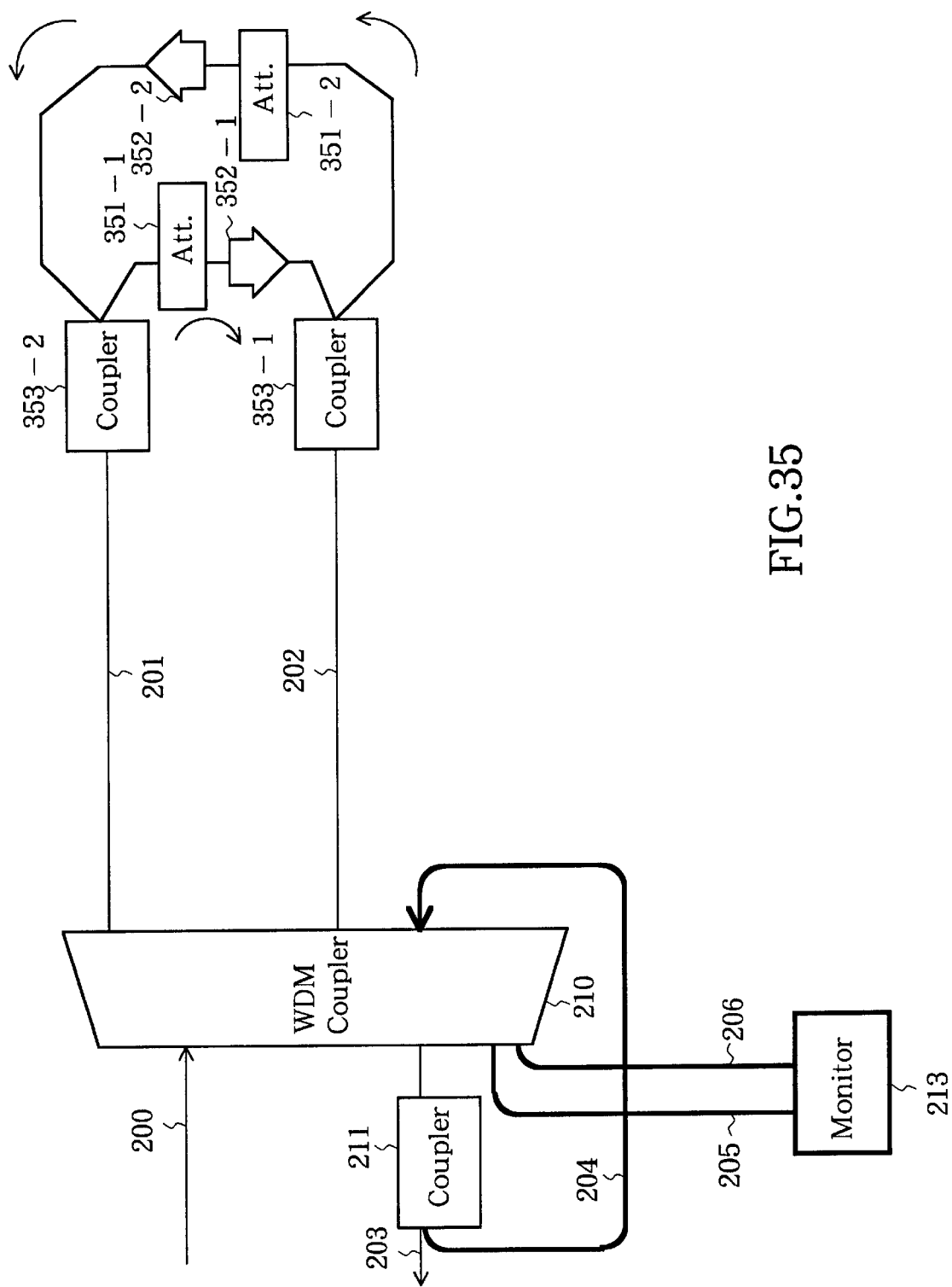
FIG. 35 shows another example of construction for realizing the construction shown in FIG. 26 by a wavelength-multiplexed light gain equalizer.

FIG. 26 shows a modification of the construction shown in FIG. 16. In this example, a signal light having wavelength of 1550 nm is on an optical transmission line 201 and a signal light having wavelength of 1554 nm is on an optical transmission line 202. These signal lights are wavelength-multiplexed by an optical WDM coupler 210 exemplified by the arrayed waveguide diffraction grating and output to an optical transmission lines 203 and a portion thereof is dropped by an optical coupler 211 provided in the optical transmission line 203. The wavelength-multiplexed and dropped signal light is input through an optical coupler 204 to one of ports of the optical WDM coupler 210, which is on the optical transmission line side and is different from ports connected to the optical transmission lines 201 and 202. Due to the router function of the optical WDM coupler 210, a monitor light having wavelength of 1554 nm is output onto an optical transmission line 205 and a monitor light having wavelength of 1550 nm is output onto an optical transmission line 206, respectively, and these monitor lights are input to an optical monitor 213.

FIGS. 27 to 35 show examples having constructions shown in FIGS. 17 to 25 with a portion of each construction being replaced by the construction shown in FIG. 26. Operations of the constructions shown in FIGS. 27 to 35 are similar to those of the constructions shown in FIGS. 17 to 25, respectively, and, so, detailed descriptions thereof are omitted.

Although the wavelength-multiplexed light monitor has been described for the case where the number of wavelengths to be multiplexed on each optical transmission line is two, the number of wavelengths to be multiplexed is not limited to 2 and an arbitrary number of wavelengths, such as 4, 8, 16, 32 or 64, can be set. Further, although the optical wavelength division coupler or the optical WDM coupler has been described as having the arrayed waveguide diffraction grating, it is possible to employ a wavelength router or a wavelength MUX coupler, which has a grating structure having similar functions to those of the optical wavelength division coupler or the optical WDM coupler, suitably. In a case where insertion losses of the optical WDM coupler are different for respective wavelengths, it is possible to equalize light levels thereof by suitably inserting an optical amplifier or an optical attenuator in each waveguide.

Further, in the separately provided optical transmission lines for respective wavelength signals described with reference to FIG. 17, the means for comparing a forward travelling optical signal with a returned optical signal may take other constructions.

Further, although the optical gate, the optical amplifier and the optical attenuator have been described as respective unit parts, they may be any so long as they have the required functions. For example, the functions of the optical gate, the optical amplifier and the attenuator can be achieved when an EDFA gate switch is used.

Since, in the present invention, the optical WDM coupler for wavelength-dividing a wavelength-multiplexed light to a plurality of lights having different wavelengths or wavelength-multiplexing lights having a plurality of different wavelengths is concurrently used as the optical wavelength division coupler for deriving the monitor light, there is no need of newly providing a band-pass filter or a wavelength divider for the optical monitor and a low cost optical monitor can be realized.

What is claimed is:

1. An optical add-drop multiplexer comprising:

an optical wavelength division coupler for wavelength-dividing a wavelength multiplexed light input from one optical transmission line to a plurality of wavelength lights having different wavelengths;

a plurality of light receivers for receiving the respective wavelength different wavelengths output from said optical wavelength division coupler;

a plurality of optical gate switches each for on-off controlling a therethrough, a plurality of light transmitters provided correspondingly to the plurality of said light receivers, each said light transmitter transmitting a different one of the plurality of wavelength lights having different wavelengths constituting the wavelength multiplexed light;

an optical wavelength multiplexer coupler for receiving light outputs of said optical gate switches and light outputs of said light transmitters and sending a wavelength multiplexed tight to the other optical transmission line; and an optical signal deterioration monitor means, wherein said optical signal deterioration monitor means comprises:

means for monitoring an optical signal fault by either detecting the optical loss of signal by determining presence or absence of a signal light on a basis of calculation of an optical S/N ratio from a ratio of intensity of light having wavelength within a wavelength range of a certain width including at least the signal light to intensity of spontaneously emitted light having wavelength within a different wavelength range of substantially the same width as the predetermined width or determining presence or absence of the signal light from intensity of light within a wavelength range of a certain width including the signal light, or detecting the optical loss of wavelength by monitoring wavelength deviation of the signal light from intensity of light within the wavelength range;

means for calculating an optical S/N ratio from a ratio of intensity of light within a wavelength range of a predetermined width including at least the signal light to intensity of spontaneously emitted light having wavelength within a different wavelength range of substantially the same width as the predetermined width and detecting the optical signal degrade when the optical S/N ratio becomes smaller than a predetermined threshold value; and means for converting a fault signal into the optical alarm indication signal in an optical layer by cutting off a signal output correspondingly to an input when said optical signal deterioration monitor means detects in the input the fault signal of either the optical loss of signal, the optical loss of wavelength or the optical signal degrade.

2. An optical signal deterioration monitor system comprising an optical add-drop multiplexer which is provided in each node of an optical network, for adding, dropping or passing a wavelength multiplexed optical signal, and monitors an optical signal fault within the optical network, said optical add-drop multiplexer comprising:

an optical wavelength division coupler for wavelength-dividing a wavelength multiplexed light input from one optical transmission line to a plurality of wavelength lights having different wavelengths;

a plurality of light receivers for receiving the respective wavelength different wavelengths output from said optical wavelength division coupler;

a plurality of optical gate switches each for on-off controlling a therethrough;

a plurality of light transmitters provided correspondingly to the plurality of said light receivers, each said fight transmitter transmitting a different one of the plurality of wavelength lights having different wavelengths constituting the wavelength multiplexed light;

an optical wavelength multiplexer coupler for receiving fight outputs of said optical gate switches and light outputs of said light transmitters and sending a wavelength multiplexed tight to the other optical transmission line; and an optical signal deterioration monitor means comprising
means for monitoring an optical signal fault by either detecting an optical loss of signal by determining presence or absence of a signal light on a basis of calculation of an optical S/N ratio from a ratio of intensity of light within a wavelength range of a predetermined width including at least the signal light to intensity of spontaneously emitted fight having wavelength within a different wavelength range of substantially the same width as the predetermined width or determining presence or absence of the signal light from intensity of light within a wavelength range of a certain width including the signal light, or detecting the optical loss of wavelength by monitoring wavelength deviation of the signal fight from intensity of light within the wavelength range;

means for calculating an optical S/N ratio from a ratio of intensity of fight within a wavelength range of a predetermined width including at least the signal light to intensity of spontaneously emitted light having wavelength within a different wavelength range of substantially the same width as the predetermined width and detecting the optical signal degrade when the optical S/N ratio becomes smaller than a predetermined threshold value; and means for converting a fault signal into the optical alarm indication signal in an optical layer by cutting off a signal output correspondingly to an input when said optical signal deterioration monitor means detects in the input the fault signal of either the optical loss of signal, the optical loss of wavelength or the optical signal degrade and noticing the optical alarm indication signal to said nodes on the downstream side.

3. An optical signal deterioration monitor system as claimed in claim 2, wherein a signal reproducing repeater is arranged on an upstream side of a location of said optical add-drop multiplexer at which a network fault is detected, and at least one line terminator connected to said optical layer is arranged between said optical add-drop multiplexer and said signal reproducing repeater, and wherein the network fault is recovered by sending a monitor signal issued by said signal reproducing repeater to said line terminator so that an occurrence of the network fault is noticed from said signal reproducing repeater to said line terminator when said signal reproducing repeater detects the network fault.

4. An optical signal deterioration monitor system as claimed in claim 2, wherein a signal reproducing repeater is arranged on an upstream side of a location of said optical add-drop multiplexer at which a network fault is detected, and said signal reproducing repeater has an optical alarm indication signal issuing function in an optical layer, and wherein the network fault is recovered by an optical path switching performed by said optical add-drop multiplexer in said optical layer according to a notice of the network fault to at least one of said optical repeater/amplifier on the downstream side of said signal reproducing repeater and said optical add-drop multiplexer and by a notice of network fault performed by a transmission line connected to said optical layer from said optical layer to said transmission line by converting the optical loss of signal of the network fault in said optical layer into the optical alarm indication signal.

5. An optical signal deterioration monitor system as claimed in claim 2, wherein a network management information is assigned to a wavelength range different from a main signal wavelength range to be processed by said optical wavelength add-drop multiplexer to perform a network information communication between said nodes independently from framing format.

6. An optical signal deterioration monitor system including an optical network having;

an optical add-drop multiplexer for adding, dropping or passing a wavelength multiplexed optical signal;

an optical repeater/amplifier for amplifying and repeating a wavelength multiplexed light; and a line terminator for terminating an optical signal and converting the optical signal into a signal of SONET/SDH standard, wherein each of said optical add-drop multiplexer and said optical repeater/amplifier comprises:

optical signal deterioration monitor means including means for monitoring an optical signal fault by either detecting the optical loss of signal by determining presence or absence of a signal light on a basis of calculation of an optical S/N ratio from a ratio of intensity of light having wavelength within a wavelength range of a predetermined width including at least the signal light to intensity of spontaneously emitted light having wavelength within a different wavelength range of substantially the same width as the predetermined width or determining presence or absence of the signal light from intensity of light having wavelength within a certain wavelength range including the signal light, or detecting the optical loss of wavelength by monitoring wavelength deviation of the signal light from intensity of light having wavelength within the wavelength range;

means for calculating an optical S/N ratio from a ratio of intensity of light having wavelength within a wavelength range of a predetermined width including at least the signal light to intensity of spontaneously emitted light having wavelength within a different wavelength range of substantially the same width as the predetermined width and detecting the optical signal degrade when the optical S/N ratio becomes smaller than a predetermined threshold value; and means for converting a fault signal into an optical alarm indication signal in an optical layer by cutting off a signal output correspondingly to an input when said optical signal deterioration monitor means detects in the input the fault signal of either the optical loss of signal, the optical loss of wavelength or the optical signal degrade and noticing the optical alarm indication signal to said nodes on the downstream side, wherein, in order to notice a network fault occurrence to said line terminator on the downstream side on the detection location of the network fault when the network fault is detected in a section layer of the SONET/SDH in said optical network, an optical signal cut-off fault in said network is monitored by at least one of the optical loss of signal and the optical alarm indication signal in said optical layer instead of an line alarm indication signal in the SONET/SDH layer output again to said line terminator to notice the network fault to said line terminator by reading in the line alarm indication signal assigned to a line overhead to identify the network fault.

7. An optical signal deterioration monitor system as claimed in claim 6, wherein, when a network fault occurs in said optical layer, said line terminator is forced to detect the loss of signal by converting the optical loss of signal into the optical alarm indication signal and noticing the network fault from said optical layer to the SONET/SDH layer.

8. An optical signal deterioration monitor system as claimed in claim 6, wherein a signal reproducing repeater of the SONET/SDH standard is arranged on the upstream side of the network fault detection location of said optical add-drop multiplexer and at least one line terminator of the SONET/SDH standard is arranged between said optical add-drop multiplexer and said signal reproducing repeater and wherein a recovery of the network fault is performed by activating an automatic protection system of the SONET/SDH standard by sending the line alarm indication signal issued by said signal reproducing repeater to said line terminator so that the occurrence of the network fault is noticed from said signal reproducing repeater to said line terminator of the SONET/SDH standard on the downstream side when the network fault is detected by said signal reproducing repeater.

9. An optical signal deterioration monitor system as claimed in claim 6, wherein a signal reproducing repeater of the SONET/SDH standard is arranged on the upstream side of the network fault detection location of said optical add-drop multiplexer and said signal reproducing repeater has an optical alarm indication signal issuing function in an optical layer, and wherein the network fault is recovered by either a switching of at least one of optical paths performed by said optical add-drop multiplexer in said optical layer according to a notice of the network fault to at least one of said optical repeater/amplifier and said optical wavelength add-drop multiplexer on the downstream side of said signal reproducing repeater or an automatic protection system of said SONET/SDR which is performed by a notice of the network fault from said optical layer to said SONET/SDH layer by converting the optical loss of signal of the network fault in said optical layer into the optical alarm indication signal to notify said line terminator the detection of the loss of signal.

10. An optical signal deterioration monitor system as claimed in claim 6, wherein a network management information is assigned to a wavelength range different from a main signal wavelength range to perform a network information communication between said optical add-drop multiplexers forming nodes and between said optical add-drop multiplexers and said line terminator.

* * * * *